US009620172B2

(12) United States Patent
Knight et al.

(10) Patent No.: US 9,620,172 B2
(45) Date of Patent: Apr. 11, 2017

(54) SYSTEMS AND METHODS FOR CONVERTING INTERACTIVE MULTIMEDIA CONTENT AUTHORED FOR DISTRIBUTION VIA A PHYSICAL MEDIUM FOR ELECTRONIC DISTRIBUTION

(71) Applicant: Rovi Technologies Corporation, Santa Clara, CA (US)

(72) Inventors: Anthony David Knight, San Jose, CA (US); Ian Michael Lewis, Oxfordshire (GB); Andrew Maurice Devitt, London (GB)

(73) Assignee: Rovi Technologies Corporation, San Carlos, CA (US)

( * ) Notice: Subject to any disclaimer, the term of this patent is extended or adjusted under 35 U.S.C. 154(b) by 0 days.

(21) Appl. No.: 14/609,337

(22) Filed: Jan. 29, 2015

(65) Prior Publication Data
US 2015/0213835 A1 Jul. 30, 2015

Related U.S. Application Data

(63) Continuation of application No. 13/182,376, filed on Jul. 13, 2011, now Pat. No. 8,965,180.
(Continued)

(51) Int. Cl.
*G11B 27/034* (2006.01)
*G11B 27/32* (2006.01)
(Continued)

(52) U.S. Cl.
CPC .......... *G11B 27/034* (2013.01); *G11B 27/329* (2013.01); *H04L 65/602* (2013.01);
(Continued)

(58) Field of Classification Search
CPC ............... G11B 27/034; G11B 27/329; G11B 2220/2562; H04N 21/234354; H04N 21/4884; H04N 21/84; H04L 65/602
See application file for complete search history.

(56) References Cited

U.S. PATENT DOCUMENTS 4,838,843 A 6/1989 Westhoff
5,313,881 A 5/1994 Morgan
(Continued)

FOREIGN PATENT DOCUMENTS

EP 0865362 A1 9/1998
JP 2001344828 A 12/2001
(Continued)

OTHER PUBLICATIONS

International Application Serial No. PCT/US2008/013744, International Search Report, dated Mar. 13, 2009.
(Continued)

*Primary Examiner* — Tat Chio
(74) *Attorney, Agent, or Firm* — Ropes & Gray LLP

(57) ABSTRACT

Systems and methods for converting interactive multimedia content authored for distribution via a physical medium for electronic distribution are disclosed. One embodiment of the invention includes building an object model of interactive multimedia content authored for distribution via a physical medium using a content authoring system, automatically authoring a user interface based upon the object model using the content authoring system, and packing the transcoded multimedia content into at least one container.

20 Claims, 12 Drawing Sheets

Related U.S. Application Data

(60) Provisional application No. 61/364,001, filed on Jul. 13, 2010.

(51) Int. Cl.

| | | |
|---|---|---|
| *H04N 21/2343* | (2011.01) | |
| *H04N 21/488* | (2011.01) | |
| *H04N 21/84* | (2011.01) | |
| *H04L 29/06* | (2006.01) | |

(52) U.S. Cl.
CPC . *H04N 21/234354* (2013.01); *H04N 21/4884* (2013.01); *H04N 21/84* (2013.01); *G11B 2220/2562* (2013.01)

(56) References Cited

U.S. PATENT DOCUMENTS

| | | | |
|---|---|---|---|
| 5,316,464 A | 5/1994 | Lexell | |
| 5,320,219 A | 6/1994 | Ward | |
| 5,375,515 A | 12/1994 | Morgan | |
| 5,435,246 A | 7/1995 | Edman | |
| 5,504,688 A | 4/1996 | Letourneau | |
| 5,742,569 A | 4/1998 | Yamamoto et al. | |
| 5,787,802 A | 8/1998 | McNab | |
| 5,991,399 A | 11/1999 | Graunke et al. | |
| 6,302,176 B1 | 10/2001 | Chen | |
| 6,310,601 B1 | 10/2001 | Moore et al. | |
| 6,452,459 B1 | 9/2002 | Chan et al. | |
| 6,453,459 B1* | 9/2002 | Brodersen | G11B 27/034 386/332 |
| 6,496,802 B1 | 12/2002 | van Zoest et al. | |
| 6,585,021 B2 | 7/2003 | Clark et al. | |
| 6,799,621 B2 | 10/2004 | Flynn et al. | |
| 7,257,732 B2 | 8/2007 | Zarnke et al. | |
| 7,340,481 B1 | 3/2008 | Baer et al. | |
| 7,389,247 B2 | 6/2008 | Pestoni et al. | |
| 8,965,180 B2 | 2/2015 | Knight et al. | |
| 2003/0028451 A1 | 2/2003 | Ananian | |
| 2003/0121043 A1* | 6/2003 | Reinold | H04H 20/08 725/62 |
| 2003/0188183 A1 | 10/2003 | Lee et al. | |
| 2004/0039934 A1* | 2/2004 | Land | G11B 27/34 726/26 |
| 2004/0267742 A1 | 12/2004 | Polson et al. | |
| 2005/0108320 A1 | 5/2005 | Lord et al. | |
| 2005/0169606 A1 | 8/2005 | Yoo et al. | |
| 2005/0262149 A1 | 11/2005 | Jung et al. | |
| 2006/0161584 A1 | 7/2006 | Kawakami | |
| 2006/0165381 A1 | 7/2006 | Eckleder et al. | |
| 2007/0105253 A1 | 5/2007 | Hendriks et al. | |
| 2007/0112826 A1* | 5/2007 | Laksono | G11B 20/00007 |
| 2007/0150548 A1 | 6/2007 | Nakagawa | |
| 2007/0192352 A1 | 8/2007 | Levy | |
| 2007/0192445 A1 | 8/2007 | Lord et al. | |
| 2007/0256141 A1 | 11/2007 | Nakano et al. | |
| 2008/0216106 A1* | 9/2008 | Maxwell | G06F 17/30017 725/1 |
| 2008/0313680 A1 | 12/2008 | Suzanne et al. | |
| 2009/0156181 A1 | 6/2009 | Athsani et al. | |
| 2009/0257336 A1 | 10/2009 | Knight et al. | |
| 2009/0259684 A1 | 10/2009 | Knight et al. | |
| 2010/0185729 A1 | 7/2010 | Lord et al. | |
| 2011/0013888 A1* | 1/2011 | Sasaki | H04N 21/234327 386/353 |
| 2011/0060741 A1 | 3/2011 | Heller et al. | |
| 2011/0060742 A1 | 3/2011 | Heller et al. | |
| 2011/0060991 A1 | 3/2011 | Grant et al. | |
| 2011/0061002 A1 | 3/2011 | Bethune et al. | |
| 2012/0014663 A1 | 1/2012 | Knight et al. | |
| 2012/0014674 A1 | 1/2012 | Knight et al. | |

FOREIGN PATENT DOCUMENTS

| | | |
|---|---|---|
| JP | 2004004245 A | 1/2004 |
| JP | 2004199590 A | 7/2004 |
| JP | 2005-028729 A | 2/2005 |
| JP | 2006212834 A | 8/2006 |
| KR | 1020070076748 | 7/2007 |
| WO | WO-2006054987 A1 | 5/2006 |
| WO | WO-2007059664 A1 | 5/2007 |
| WO | WO-2008108966 A1 | 9/2008 |
| WO | WO-2012009485 A1 | 1/2012 |

OTHER PUBLICATIONS

The Kaleidescape System, The Ultimate Entertainment Experience Brochure, printed from www.kaleidescape.com on Apr. 22, 2008 (9 pages).
International Application Serial No. PCT/US2009/002142, International Search Report, dated Nov. 25, 2009.
European Application Serial No. EP 09729772.5, Extended Search Report, dated May 10, 2013.
Apple, Inc., "iTunes Extra/iTunes LP Development: Template How-To v.1.1," Jan. 26, 2010, 58 pages.
International Search Report and Written Opinion for Application No. PCT/US2011/043923, International Filing Date Jul. 13, 2011, Search Completed Sep. 15, 2011, Mailed Sep. 29, 2011, 21 pgs.
"Any DVD Converter," Dec. 30, 2009, Retrieved on Aug. 25, 2011, http://web.archive.org/web/20091230041557//http://any-video-converter.com/products/for_dvd/.
"How to rip DVDs in Windows/Mac using Handbrake," Oct. 3, 2008, Retrieved Aug. 30, 2011, http://my-guides.net/en/content/view/111/26/.
"Screenshot—Any DVD Converter," Dec. 30, 2009, Retrieved on Aug. 25, 2011, http://web.archive.org/web/20091230070300/http://any-video-converter.com/products/for_dvd/screenshot.php.
Hickson, Ian et al., "HTML5—A vocabulary and associated APIs for HTML and XHTML," Mar. 4, 2010, Retrieved Mar. 4, 2010, http://www.w3.org/TR/2010/WD-html5-20100304/Overview.html, 709 pgs., Relevant pages: pp. 21-26 (paragraph 2.1), pp. 62-70 (paragraph 3.1), pp. 78-84 (paragraph 3.2.5), pp. 108-115 (paragraph 4.3), pp. 162-217 (paragraph 4.8), pp. 303-312 (paragraph 4.11.3-paragraph 4.11.5).
Knight, Tony, "Metadata & the Supply Chain," Mar. 24, 2011, Retrieved on Aug. 24, 2011, http://www.mediatech.net/fileadmin/templates/association/pdf/enewsLas_Vegas_2011/Rovi Slides MediaTech2011.pdf.
Lawson, Bruce, "Accessible HTML5 Video with JavaScripted captions," Jan. 13, 2010, Retrieved Aug. 26, 2011, http://dev.opera.com/articles/view/accessible-html5-video-with-javascripted-captions/.
Pieters, Sison, "Everything you need to know about HTML5 video and audio," Mar. 3, 2010, Retrieved Aug. 26, 2011, http://my.opera.com/core/blog/2010/03/03/everything-you-need-to-know-about-html5-video-and-audio-2.
Pilgrim, Mark, "Video on the Web," Nov. 16, 2009, Retrieved on Aug. 26, 2011, http://web.archive.org/web/20091116135139/http://diveintohtml5.org/video.html.
Non-Final Office Action, U.S. Appl. No. 12/316,409 dated Mar. 1, 2012.
Non-Final Office Action, U.S. Appl. No. 12/316,409 dated Jun. 11, 2013.
Non-Final Office Action, U.S. Appl. No. 12/316,409 dated Oct. 3, 2014.

* cited by examiner

SYSTEMS AND METHODS FOR CONVERTING INTERACTIVE MULTIMEDIA CONTENT AUTHORED FOR DISTRIBUTION VIA A PHYSICAL MEDIUM FOR ELECTRONIC DISTRIBUTION

CROSS-REFERENCES TO RELATED APPLICATIONS

The present invention is a continuation of and, claims priority to and benefit of U.S. patent application Ser. No. 13/182,376, filed Jul. 13, 2011, (currently allowed), which claims priority to and benefit of U.S. Provisional Patent Application Ser. No. 61/364,001 entitled "Conversion of Content to a Web Centric Document Object Model", filed Jul. 13, 2010, the disclosures of which are both incorporated by reference herein in their entirety.

FIELD OF THE INVENTION

The present invention relates to electronic sell-through of video and more specifically to the electronic sell-through of interactive multimedia content authored for distribution via DVD.

BACKGROUND

The DVD-Video specification created by the DVD forum has proven to be a very robust and consumer friendly method for delivering high quality interactive multimedia content to consumers. Since the release of DVDs in 1997, they have enjoyed one of the fastest consumer adoption rates of any consumer electronics device in history. Since 2007, however, DVD production has entered a period of decline. The decline in popularity of DVDs is viewed by many as being related to a decline in popularity of physical media and an increased demand for the electronic delivery of interactive content. Indeed, many consumer electronics devices are now designed to receive content via a network connection instead of or in addition to via physical media and many services offer electronic sell-through of content for viewing via such consumer electronics devices.

The HyperText Markup Language (HTML) standard specified by the World Wide Web Consortium specifies a markup language that can be used to control the rendering of web pages. HTML pages are written in the form of HTML elements including tags. HTML5 is the fifth revision of the HTML standard that adds many new syntactical features. These include the <video>, <audio>, and <canvas> elements, as well as the integration of Scalable Vector Graphics content. The new features of HTML5 are designed to make it easy to include and handle multimedia and graphical content on the web without having to resort to proprietary plugins and APIs. Many new consumer electronic devices, both as set top boxes and mobile devices, are moving to support some or all of the HTML5 specification.

A Document Object Model (DOM) is a convention for representing and interacting with objects in HTML documents. Aspects of the DOM (such as its elements) may be addressed and manipulated using DOM scripting. DOM scripting refers to programmatically accessing a DOM using a scripting language. In the context of HTML5, the scripting language utilized for DOM scripting is typically JavaScript licensed by Oracle Corporation of Redwood Shores, Calif. JavaScript is an implementation of the ECMAScript language standard and can be used to provide enhanced user interfaces and dynamic websites by providing programmatic access to the DOM of a HTML5 page.

Web browsers rely on rendering engines to parse HTML into a DOM and based upon the DOM and DOM scripting the rendering engine formats content for display. The <video> element was introduced by HTML5 to enable the display of videos, without the use of additionally installed plug-ins. Using any number of <source> elements, the browser can choose automatically which file to download or the JavaScript canPlay( ) function can be used to determine which file to download. By specifying the Internet media type (also referred to as a Multipurpose Internet Mail Extensions type or MIME type), the web browser can determine whether it can decode a specific video file by querying its multimedia framework for third party codecs. The current HTML5 draft specification does not specify which video formats browsers should support.

SUMMARY OF THE INVENTION

Systems and methods in accordance with embodiments of the invention enable the electronic sell-through (EST) of multimedia content originally authored for distribution via physical media. When multimedia content is distributed via physical media, including but not limited to DVDs, the multimedia content is typically authored based upon the characteristics of the physical medium on which it will be distributed. For example, the DVD specification assumes that multimedia content will be distributed via an optical disk on which the multimedia content will be randomly accessible. Were the same content to be distributed electronically (e.g. via the Internet) instead of via physical media, the same assumptions concerning the availability and accessibility of the content do not necessarily apply. In addition, playback devices configured to download the content electronically may not support decoding of the multimedia content. Content authoring systems in accordance with many embodiments of the invention are configured to ingest interactive multimedia content authored for distribution via physical media and to generate interactive multimedia content formatted for electronic distribution. In this way, content owners can avoid the expense of separately authoring interactive multimedia content for distribution via physical media and EST.

One embodiment of the invention includes building an object model of interactive multimedia content authored for distribution via a physical medium using a content authoring system, automatically authoring a user interface based upon the object model using the content authoring system, and packing the transcoded multimedia content into at least one container file.

In a further embodiment, the interactive multimedia content is authored in accordance with the DVD-Video specification.

In a further embodiment, the interactive multimedia content is authored in accordance with the DVD-Video specification.

In another embodiment, the interactive multimedia content includes a plurality of files including at least one IFO file containing tables describing objects within the interactive multimedia content and at least one VOB file containing multimedia content and navigation information.

In a still further embodiment, building an object model of interactive multimedia content authored for distribution via a physical medium using a content authoring system includes parsing the at least one IFO file and the at least one VOB file to build an object model for the interactive multimedia content using the content authoring system.

In still another embodiment, parsing the at least one IFO file and the at least one VOB file to build an object model for the interactive multimedia content includes identifying program chains within the interactive multimedia content using the content authoring system.

In a yet further embodiment, identifying program chains within the interactive multimedia content using the content authoring system further includes identifying cells within at least one VOB file associated with a program chain.

In yet another embodiment, parsing the at least one IFO file and the at least one VOB file to build an object model for the interactive multimedia content includes identifying navigation information within the interactive multimedia content using the content authoring system.

In a further embodiment again, automatically authoring a user interface based upon the object model using the content authoring system includes generating at least one HTML5 page using the object model.

In another embodiment again, automatically authoring a user interface based upon the object model using the content authoring system further includes generating at least one JavaScript file associated with the at least one HTML5 page using the object model.

In a further additional embodiment, parsing the at least one IFO file and the at least one VOB file to build an object model for the interactive multimedia content includes identifying program chains within the interactive multimedia content using the content authoring system, and at least one HTML5 page is generated per program chain.

In another additional embodiment, parsing the at least one IFO file and the at least one VOB file to build an object model for the interactive multimedia content includes identifying navigation information within the interactive multimedia content using the content authoring system, and the navigation information is used to generate JavaScript within the JavaScript file.

In a still yet further embodiment, the interactive multimedia content is authored in accordance with the BD-ROM specification.

In still yet another embodiment, the interactive multimedia content includes a plurality of files including an index.bdmv file describing titles and Movie Objects within the interactive multimedia content, an MovieObject.bdmv file containing information concerning at least one Movie Object, and at least one Clip AV stream file with an associated Clip Information File.

In a still further embodiment again, building an object model of interactive multimedia content authored for distribution via a physical medium using a content authoring system includes parsing the index.bdmv file, the MovieObject.bdmv file and the at least one Clip AV stream file and associated Clip Information File to build an object model for the interactive multimedia content using the content authoring system.

In still another embodiment again, parsing the at least one Clip AV stream file and associated Clip Information File includes identifying Button Objects.

In a still further additional embodiment, automatically authoring a user interface based upon the object model using the content authoring system includes generating at least one HTML5 page using the object model.

Still another embodiment also includes transcoding at least a portion of the multimedia content using the content authoring system.

In a yet further embodiment again, transcoding at least a portion of the multimedia content using the content authoring system includes transcoding a least a portion of the video content to reduce the size of the video content.

In yet another embodiment again, transcoding at least a portion of the multimedia content using the content authoring system includes transcoding a least a portion of the video content into a plurality of streams having different bitrates.

In a yet further additional embodiment, transcoding at least a portion of the multimedia content using the content authoring system includes converting subtitles to text.

In yet another additional embodiment, packing the multimedia content into at least one container file includes multiplexing at least one video stream and at least one audio stream into at least one container file.

A further additional embodiment again also includes transcoding a least a portion of the video content into a plurality of streams having different bitrates. In addition, packing the transcoded multimedia content into at least one container file includes packing each video stream into at least one separate container file.

In another additional embodiment again, packing the multimedia content into at least one container file includes packing the authored user interface and the multimedia content into at least one container file.

In a further embodiment, packing the multimedia content into at least one container file includes packing the authored user interface and the transcoded multimedia content into a single container file.

Another embodiment also includes generating a unique identifier for the at least one container file.

Another embodiment of the invention includes a computer configured to ingest interactive multimedia content authored for distribution via physical media and to convert the interactive multimedia content for electronic distribution. In addition, the computer is configured to build an object model of interactive multimedia content authored for distribution via a physical medium and automatically author a user interface based upon the object model, and the content authoring system is configured to pack the transcoded multimedia content into at least one container file.

In a further embodiment, the interactive multimedia content is authored in accordance with the DVD-Video specification.

In still another embodiment, the interactive multimedia content includes a plurality of files including at least one IFO file containing tables describing objects within the interactive multimedia content and at least one VOB file containing multimedia content and navigation information.

In a still further embodiment, the content authoring system being configured to build an object model of interactive multimedia content authored for distribution via a physical medium includes the content authoring system being configured to parse the at least one IFO file and the at least one VOB file to build an object model for the interactive multimedia content.

In yet another embodiment, the content authoring system being configured to parse the at least one IFO file and the at least one VOB file to build an object model for the interactive multimedia content includes the content authoring system being configured to identify program chains within the interactive multimedia content.

In another embodiment again, the content authoring system being configured to identify program chains within the interactive multimedia content further includes the content authoring system being configured to identify cells within at least one VOB file associated with a program chain.

In a further embodiment again, the content authoring system being configured to parse the at least one IFO file and the at least one VOB file to build an object model for the interactive multimedia content includes the content authoring system being configured to identify navigation information within the interactive multimedia content.

In another additional embodiment, the content authoring system being configured to automatically author a user interface based upon the object model includes the content authoring system being configured to generate at least one HTML5 page using the object model.

In a further additional embodiment, the content authoring system being configured to automatically author a user interface based upon the object model further includes the content authoring system being configured to generate at least one JavaScript file associated with the at least one HTML5 page using the object model.

In a still yet further embodiment, the content authoring system being configured to parse the at least one IFO file and the at least one VOB file to build an object model for the interactive multimedia content includes the content authoring system being configured to identify program chains within the interactive multimedia content, and the content authoring system is configured to generate at least one HTML5 page per program chain.

In still yet another embodiment, the content authoring system being configured to parse the at least one IFO file and the at least one VOB file to build an object model for the interactive multimedia content includes the content authoring system being configured to identify navigation information within the interactive multimedia content, and the content authoring system is configured to use the navigation information to generate JavaScript within the JavaScript file.

In a still further embodiment again, the interactive multimedia content is authored in accordance with the BD-ROM specification.

In still another embodiment again, the interactive multimedia content includes a plurality of files including an index.bdmv file describing titles and Movie Objects within the interactive multimedia content, an MovieObject.bdmv file containing information concerning at least one Movie Object, and at least one Clip AV stream file with an associated Clip Information File.

In a still further additional embodiment, the content authoring system being configured to build an object model of interactive multimedia content authored for distribution via a physical medium includes the content authoring system being configured to parse the index.bdmv file, the MovieObject.bdmv file and the at least one Clip AV stream file and associated Clip Information File to build an object model for the interactive multimedia content.

In still another additional embodiment, the content authoring system being configured to parse the at least one Clip A V stream file and associated Clip Information File includes the content authoring system being configured to identify Button Objects.

In a yet further embodiment again, the content authoring system being configured to automatically author a user interface based upon the object model includes the content authoring system being configured to generate at least one HTML5 page using the object model.

In yet another embodiment again, the content authoring system is configured to transcode at least a portion of the multimedia content and pack the transcoded multimedia content into at least one container file.

In a yet further additional embodiment, the content authoring system being configured to transcode at least a portion of the multimedia content includes the content authoring system being configured to transcode a least a portion of the video content to reduce the size of the video content.

In yet another additional embodiment, the content authoring system being configured to transcode at least a portion of the multimedia content includes the content authoring system being configured to transcode a least a portion of the video content into a plurality of streams having different bitrates.

In a further additional embodiment again, the content authoring system being configured to transcode at least a portion of the multimedia content using includes the content authoring system being configured to convert subtitles to text.

In another additional embodiment again, the content authoring system being configured to pack the transcoded multimedia content into at least one container file includes the content authoring system being configured to multiplex at least one video stream and at least one audio stream into at least one container file.

In another further embodiment, the content authoring system being configured to transcode at least a portion of the multimedia content includes the content authoring system being configured to transcode a least a portion of the video content into a plurality of streams having different bitrates, and the content authoring system being configured to pack the transcoded multimedia content into at least one container file includes the content authoring system being configured to pack each video stream into at least one separate container file.

In still another further embodiment, the content authoring system being configured to pack the content into at least one container file includes the content authoring system being configured to pack the authored user interface and the content into at least one container file.

In yet another further embodiment, the content authoring system being configured to pack the multimedia content into at least one container file includes the content authoring system being configured to pack the authored user interface and the multimedia content into a single container file.

Another further embodiment again also includes the content authoring system being configured to generate a unique identifier for the at least one container file.

DETAILED DESCRIPTION

Turning now to the drawings, systems and methods for converting interactive multimedia content authored for distribution via a physical medium for electronic distribution are illustrated. Content authoring systems in accordance with many embodiments of the invention are configured to ingest interactive multimedia content authored for distribution via physical media and to generate interactive multimedia content formatted for EST. In many embodiments, the content authoring systems ingest interactive multimedia content authored in accordance with the DVD-Video specification or the Blu-ray Disc Prerecorded application format (BD-ROM) Specification and generate HTML5 pages that enable the rendering of interactive multimedia content via the rendering engine of a web browser application. In a number of embodiments, the content authoring systems transcode and/or transrate the video to enable playback on a variety of playback devices using one or more video codecs. In several embodiments, the content authoring system adds interactive features to the interactive multimedia content that could not be supported in the original format of the interactive multimedia content. The interactive multimedia content can then be distributed via EST. In many embodiments, a guide accessible to playback devices can be utilized to locate and access the interactive multimedia content. Systems and methods for EST of multimedia content authored for distribution via physical media in accordance with embodiments of the invention are discussed further below.

System Architecture

Figure 1:
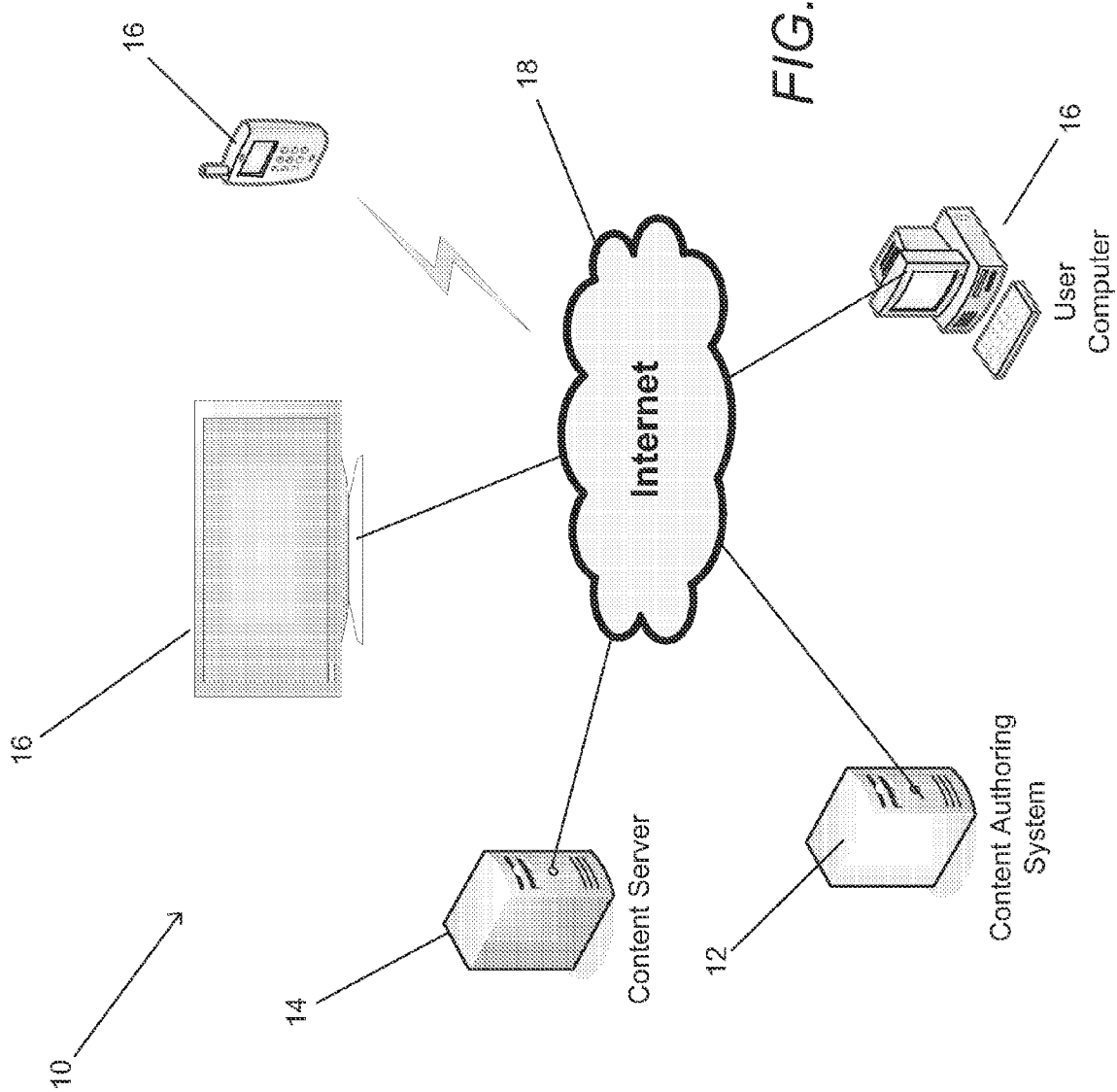
FIG. 1 is a network diagram illustrating a system for electronic sell-through of multimedia content authored for distribution via physical media in accordance with an embodiment of the invention.

When interactive multimedia content authored for distribution via physical media is converted into a format that is suited to EST, the multimedia content can be distributed to playback devices using a variety of distribution systems including (but not limited to) making the content available via servers, and/or via a peer-to-peer network. A system for electronic distribution of content authored for distribution via physical media in accordance with embodiments of the invention is illustrated in FIG. 1. The content distribution system 10 includes a content authoring system 12 that is configured to ingest interactive multimedia content authored for distribution via physical media and convert the interactive multimedia content for electronic distribution. Once the interactive multimedia content has been converted for electronic distribution, the interactive multimedia content is made available for electronic distribution to playback devices. In the illustrated embodiment, the converted interactive multimedia content is uploaded to a content distribution server 14 that can be accessed by playback devices 16 via the Internet 18. In many embodiments, the converted interactive multimedia content is uploaded to a peer-to-peer distribution network. Once the converted interactive multimedia content is made available for electronic distribution, playback devices 16 can obtain a copy of the interactive multimedia content and any rights necessary to enable playback of the content (e.g. keys to access technically protected content can be obtained from an appropriate rights management server). In the illustrated embodiment, the playback devices 16 that can access the reformatted interactive multimedia content include an Internet connected television, a mobile phone, and a personal computer. In other embodiments, any of a variety of network connected devices capable of rendering multimedia content can be utilized as playback devices including (but not limited to) set top boxes, DVD and Blu-ray players, game consoles, and tablet computers.

In many embodiments, the content authoring system 12 ingests interactive multimedia content authored in accordance with the DVD-Video specification or the BD-ROM specification and generates HTML5 pages that enable the rendering the interactive multimedia content via the rendering engine of a web browser application. In several embodiments, the process of ingesting the interactive multimedia content formatted in accordance with the DVDVideo specification or the BD-ROM specification involves building an object model of the interactive multimedia content that can be used to generate HTML5 pages. In several embodiments, the generation of the HTML5 pages is based upon utilizing the object model as the basis of a document object model (DOM) for each page and translating the navigation instructions on the DVD-Video or BD-ROM into JavaScript. In many embodiments, the audio and/or video content is transcoded (which can include transrating) so that the audio and/or video content is encoded in a format appropriate to various categories of playback device that are likely to receive the content via electronic distribution. In other embodiments, the originally encoded audio and/or video content is packed into one or more container files. In a number of embodiments, the subtitles are also converted to one or more alternative formats to enable playback on different classes of playback device.

The HTML5 pages and the associated content can be directly uploaded to a content distribution server for access by playback devices via web browser applications. In several embodiments, the HTML5 pages are formatted for downloading and local access by playback devices. In many embodiments, the HTML5 pages and associated content are packed into a container file, which can involve multiplexing, to create a single file that a playback device can download to enable local access to the interactive multimedia content. A web browser application can be used to render locally stored interactive multimedia content with the assistance of a third party codec such as (but not limited to) the Div X Plus codec distributed by Div X, LLC of San Diego, Calif. In a number of embodiments, the playback device accesses the locally stored interactive multimedia content using a dedicated playback client incorporating a rendering engine capable of rendering the HTML5 pages generated by the content authoring system.

Although distribution of multimedia content via a content distribution server is illustrated in FIG. 1, any of a variety of content distribution systems can be utilized to distribute reformatted interactive multimedia content in accordance with embodiments of the invention including systems that provide EST and/or free distribution of the content. In addition, content authoring systems in accordance with embodiments of the invention can be configured to reformat content authored in any of a number of different formats including but not limited to content authored in accordance with the DVD-Video specification or the BD-ROM specification into HTML5 and/or any other format suitable for the electronic distribution of interactive multimedia content. Processes for reformatting interactive multimedia content authored for distribution via physical media for distribution via EST in accordance with embodiments of the invention are discussed further below.

Figure 2:
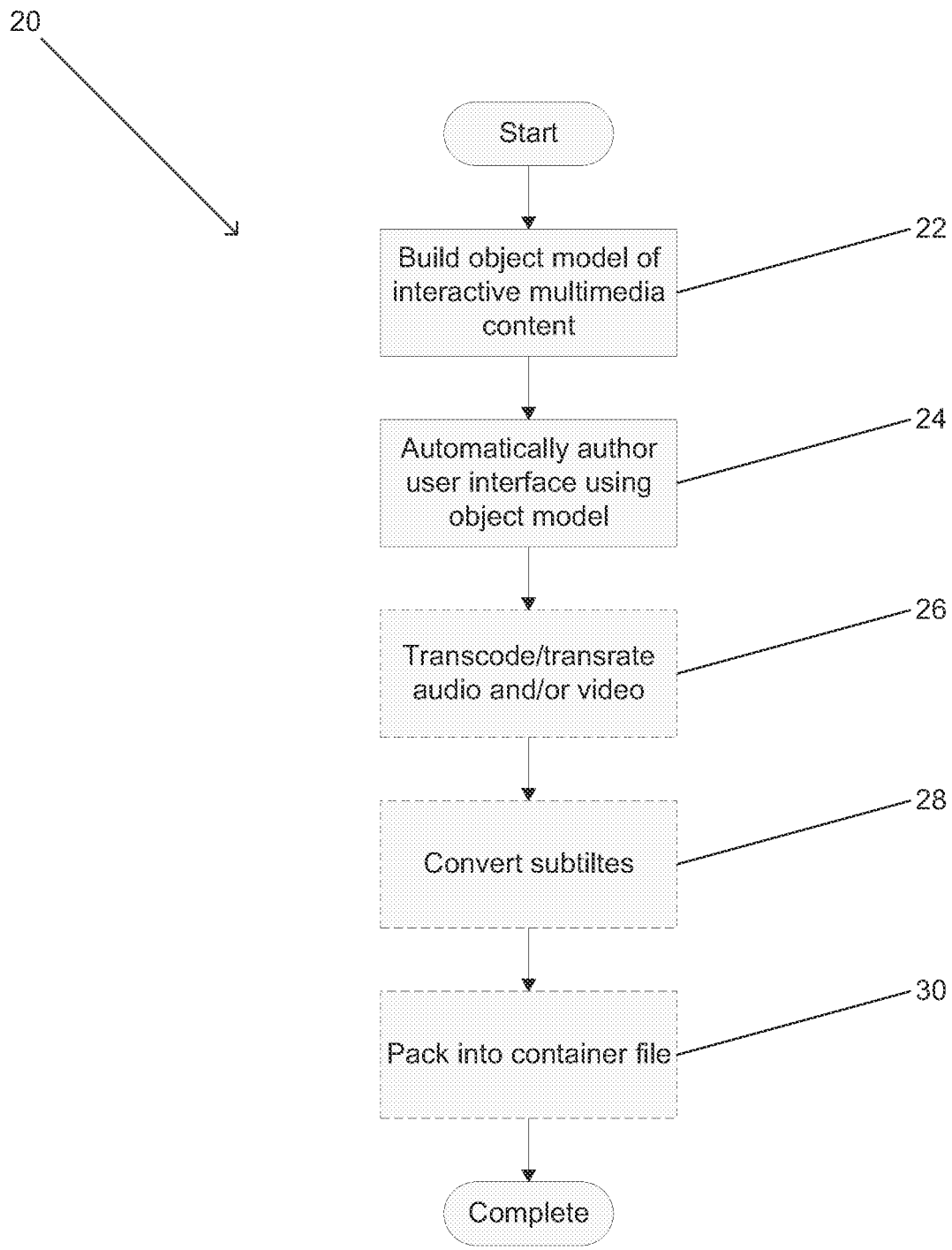
FIG. 2 is a flow chart illustrating a process for distributing content authored for distribution via physical media via electronic sell-through in accordance with an embodiment of the invention.

Converting Content Authored for Distribution Via Physical Media for Electronic Distribution Knowledge of the specification utilized when formatting interactive multimedia content for distribution via physical media can be utilized to construct an object model from the one or more files containing the originally authored multimedia content. Once an object model for the interactive multimedia content is generated, the object model can be utilized to convert the interactive multimedia content into a format that is more suited for electronic distribution. A process for converting interactive multimedia content authored for distribution via physical media for electronic distribution in accordance with an embodiment of the invention is illustrated in FIG. 2. The process 20 includes parsing the file(s) containing the interactive multimedia content to build (22) an object model of the interactive multimedia content. The object model can then be used to automatically author (24) a user interface for the interactive multimedia content. Depending upon the requirements of a specific application, the audio and/or video content of the original interactive multimedia content can be transcoded (26). In many embodiments, the electronic distribution increases the range of devices that can playback the interactive multimedia content. Therefore, the transcoding (26) results in the creation of multiple versions of the interactive multimedia content intended for use on devices having different capabilities (e.g. a higher resolution version for display on higher resolution displays such as televisions and personal computers, and a lower resolution version for display on lower resolution displays such as a personal media player or a mobile phone handset). The format of the subtitles can also be converted (28) to facilitate playback of the subtitles on devices that receive the interactive multimedia content via electronic distribution. Depending upon the manner in which the interactive multimedia content is electronically distributed, the process 20 can also involve packing (30) the audio/video/subtitle data into one or more container files. In several embodiments, the interactive user interface is also packed (30) into the one or more container files with the audio/video/subtitle content. In a number of embodiments, the user interface and the audio/video/subtitle content are packed into the DivX Plus® container file format specified by Div X, LLC of San Diego, Calif. In several embodiments, the multimedia content is encoded at different rates and packed into a number of different container files to enable the use of the interactive multimedia content in adaptive bitrate streaming applications.

Although a specific process is shown in FIG. 2, any of a variety of processes can be utilized for generating interactive multimedia content for electronic distribution based upon interactive multimedia authored for distribution via physical media in accordance with embodiments of the invention depending upon the requirements of a specific application. Processes for converting interactive multimedia content authored in accordance with the DVDVideo standard for electronic distribution in accordance with embodiments of the invention are discussed further below.

Interactive Multimedia Content Authored for Distribution Via DVD

Figure 3:
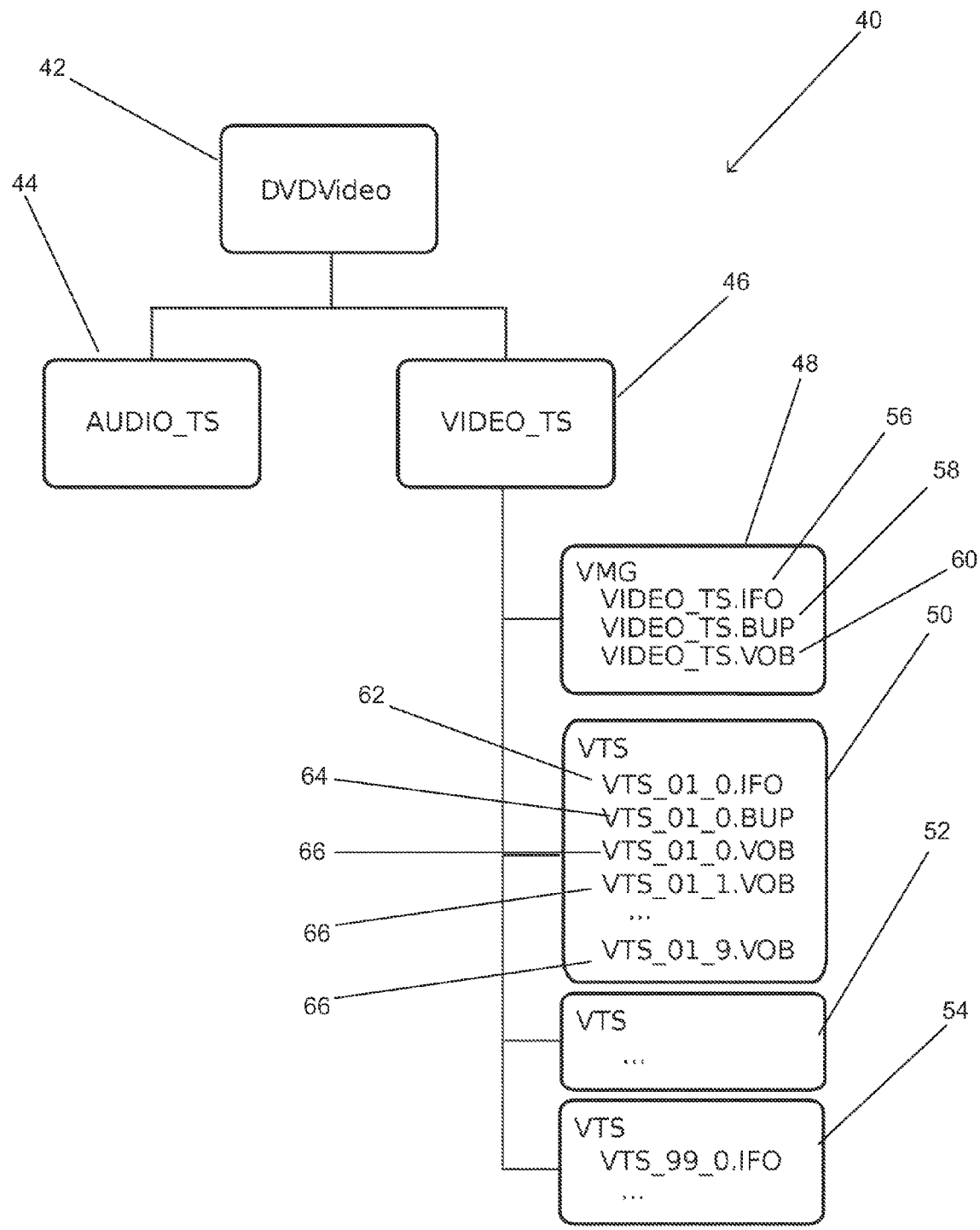
FIG. 3 is a chart reproduced from Wikipedia.org illustrating the file and directory structure of interactive multimedia content authored in accordance with the DVD-Video specification.

The DVD-Video specification was created by the DVD Forum and is not publicly available. However, a copy of the format can be obtained from the DVD Format/Logo Licensing Corporation and a great deal of information concerning the DVD-Video specification has been published via the Internet on sites including Wikipedia.org, SourceForge.net and Doom9.net. According to Wikipedia.org, the DVD-Video specification utilizes either MPEG-2 video encoding at up to 9.8 Mbits/s or MPEG-1 video encoding at up to 1.856 Mbit/s and PCM, DTS, MPEG-1 Audio Layer II (MP2), or Dolby Digital (AC-3) audio encoding. Wikipedia.org also indicates that the DVD-Video specification utilizes the Universal Disk Format (UDF) developed by the Optical Storage Technology Association, which is an implementation of the ISO/IEC 13346 and ECMA-167 file system. Wikipedia.org also provides an illustration of the directory and file structure of a DVD volume, which is reproduced as FIG. 3. The main directory, shown as "DVD-Video" 42 includes two subdirectories "AUDIO TS" 44 and "VIDEO TS" 46. According to Wikipedia.org, the "AUDIO_TS" directory 44 or Audio Title Set directory is typically empty or not present on DVD-Video discs. The "VIDEO_TS" directory 46 or Video Title Set directory is required to be present on DVD-Video discs and the "VIDEO_TS" directory contains the interactive multimedia content as a set of Video Manager (VMG) files 48 and Video Title Set (VTS) files 50, 52, 54.

According to Wikipedia.org, the Video Manager files 48 include a VIDEO_TS.IFO file 56, which stores control and playback information for the entire DVD. Such playback information can include the first play program chain, locations of all of the Video Title Sets (discussed below) on the DVD, a table of titles, number of volumes, domains for multiple languages and regional and parental control settings, information about subtitles and audio streams. The Video Manager files 48 may also include a VIDEO_TS.BUP file 58, which is a backup copy of the VIDEO_TS.IFO file 56. The Video Manager files 48 may also include the VIDEO_TS.VOB file 60, which is the first-play Video Object of the DVD-Video disc (i.e. the first video played when the playback of the interactive multimedia commences—often a copyright notice, trailers, and/or a menu).

As noted above, the "VIDEO_TS" directory 46 also includes a set of files for each Video Title Set 50, 52, 54. According to Wikipedia.org, the Video Title Set (VTS) files include a "VTS zz_O.IFO" file 62 that stores control and playback information for the Video Title Set to which it relates, where "zz" indicates a Video Title Set number from 01 to 99. The control and playback information contained within the IFO file can include information about chapters, subtitles and audio streams. The IFO file does not store any audio/video/subtitle data. SourceForge.net provides details of the specific tables within a Video Title Set IFO file.

Included in these tables is a list of Program Chains, which Wikipedia.org describes as a sequence of pointers that allows for seamless branching in DVD playback and that enable navigation during playback of the Video Title Set using "Next' and "Previous". The Video Title Set files also include a "VTS_zz_O.BUP" file 64, which is a backup copy of the "VTS_zz_O.IFO" file 62. The video, audio, subtitle and navigation streams of the interactive multimedia content are packed in accordance with the Video Object (VOB) container format. According to Wikipedia.org, VOB files are a strict subset of the MPEG program stream standard. Nonstandard data (e.g. AC-3 audio, DTS audio, and subtitles) are inserted as private streams. Subtitles or subpicture streams store subtitles as bitmap images restricted to four colors including the transparent "color". The video streams can also include closed captioning material. Each Video Title Set includes one or more VTS zz x.VOB files 66 that contain the interactive multimedia content of the Video Title Set, where "zz" indicates a Video Title Set number from 01 to 99 and "x" indicates the sequence of VOB files from 0 to 9. The "VTS zz O.VOB" is optional and contains a menu for the Video Title Set when present. The remaining VOB files contain the video and any accompanying audio and subtitle streams for the Video Title Set.

The disclosure of http://www.wikipedia.org/wiki/DVD-Video, http://dvd.sourceforge.net/dvdinfo/ifo vmg.html, and http://www.sourceforge.net/dvdinfo/ifo vts.html is hereby incorporated by reference in its entirety.

A significant selling point of the DVD-Video specification is its support of a wide variety of extra, or bonus, features in addition to a feature film. These extra features can include audio commentary, documentary features, commonly about the making of the main title, deleted scenes, photo galleries, storyboards, isolated music scores, trivia text, commentary, interactive games, film shorts, TV spots, radio spots, theatrical trailers, and teaser trailers advertising related movies or DVDs. In addition, DVDs support interactive motion menus, still pictures, up to 32 selectable subtitles, seamless branching for multiple storylines, up to 9 camera angels, and DVDROM data files that can be accessed on a computer. The conversion of all of the interactive multimedia content on a DVD-Video into a format suitable for electronic distribution in accordance with embodiments of the invention is discussed further below.

Converting DVD Content to HTML5

Figure 4:
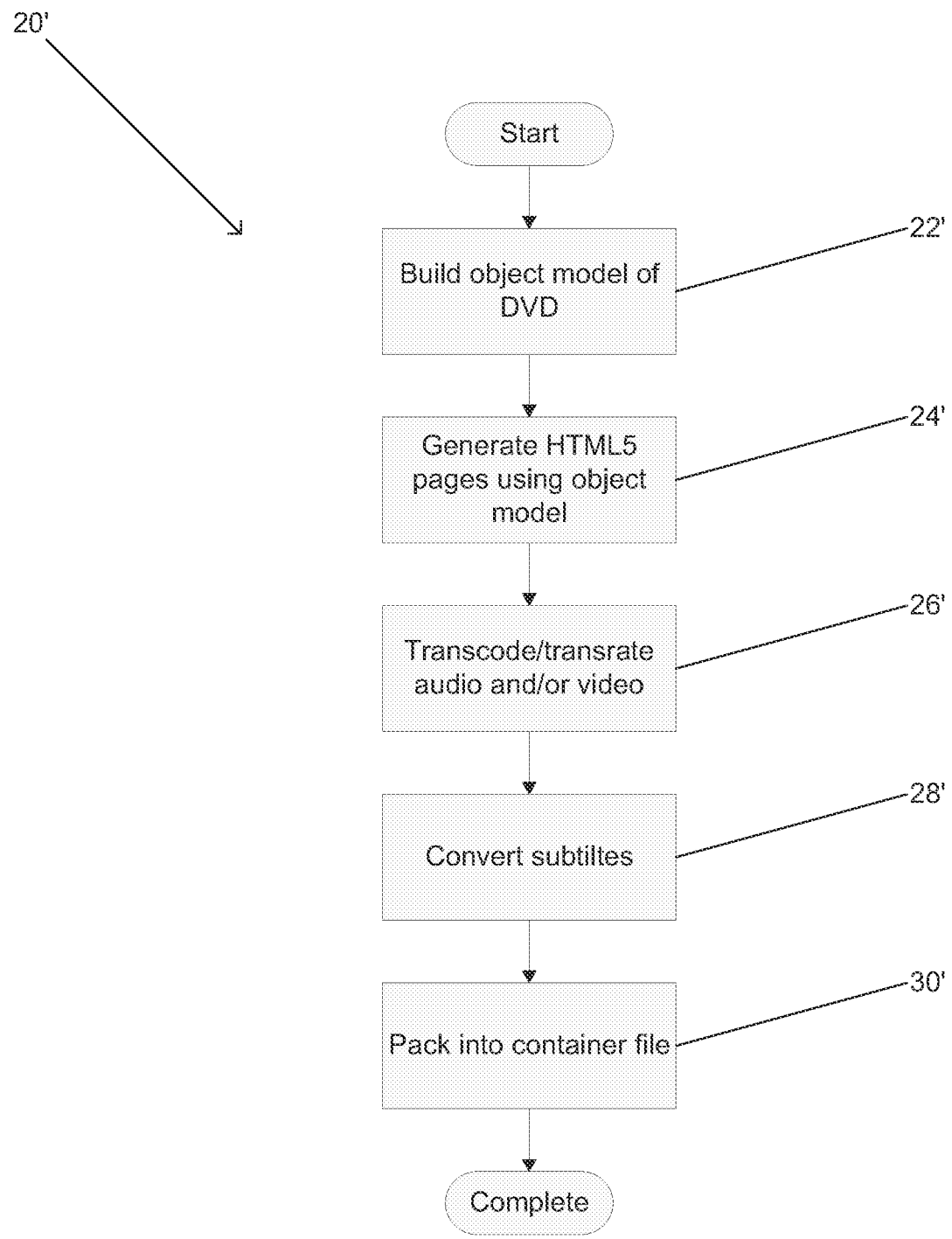
FIG. 4 is a flow chart illustrating a process for authoring interactive multimedia content using HTML5 pages based upon interactive multimedia content authored in accordance with the DVD-Video specification.

Many network-connected devices include support for rendering HTML5 pages in the form of a natively implemented web browser application. In many embodiments of the invention, interactive multimedia content authored in accordance with the DVD-Video specification is used to generate HTML5 pages that can be electronically distributed to network connected playback devices. A process for converting interactive multimedia content authored in accordance with the DVD-Video specification into HTML5 pages in accordance with an embodiment of the invention is illustrated in FIG. 4. The process 20' involves parsing the IFO files in the Video Manager and Video Title Sets of the files within the DVD-Video content to build (22') an object model representing the DVD. The object model can then be used to generate (24') HTML5 pages that capture the interactive aspects of the interactive multimedia content (e.g. the menus and the chapters) in the DOM of the HTML5 pages and associated JavaScript. The process 20' can then involve transcoding (26') the audio and video in the VOBs of the DVD. In many embodiments, MPEG-2 video in the video title sets is transcoded into H.264 video. In several embodiments, multiple H.264 elementary bitstreams are produced for playback on devices with different playback capabilities. In several embodiments, the audio in the Video Title Sets is transcoded into AAC audio. As can readily be appreciated, the specific formats to which the audio and/or video streams are transcoded and/or transrated are largely dependent upon the requirements of a specific application. Subtitles formatted in accordance with the DVD-Video specification are typically stored as bitmaps within the Video Title Set VOBs. In several embodiments, optical character recognition is applied to one or more of the bitmap subtitle streams to convert (28') the subtitle bitmaps to text. In many embodiments, the audio/video/subtitle information is packed (30') into one or more container files and the HTML5 page(s) and container file(s) containing associated image, and video elements are uploaded to a server for access by playback devices. In a number of embodiments, the HTML5 pages, associated images, and the audio/video/subtitle content for each Video Title Set of the originally authored interactive multimedia content are packed into a container file for electronic distribution. In several embodiments, the Div X Plus container file format specified by Div X, LLC of San Diego, Calif. is utilized to contain the HTML5 pages, associated images, and the audio/video/subtitle content. In other embodiments, any container file format appropriate to a specific application can be utilized including (but not limited to) the MP4 container file format specified in the MPEG-4 specification and the Matroska Media Container (MKV) specified by the Matroska Non-Profit Organization.

Processes for building object models by parsing interactive multimedia content authored in accordance with the DVD-Video specification and for authoring HTML5 pages based upon the object models in accordance with embodiments of the invention are discussed below.

Building an Object Model of a DVD

The IFO files in the Video Manager and the Video Title Sets of interactive multimedia authored in accordance with the DVD-Video specification include a number of tables that provide a table of content and control data, which can be used to identify objects within the interactive multimedia content. For example, SourceForge.net provides the details of the "Title Search Pointer Table" (TT SRPT), which contains pointers to all of the titles within the interactive multimedia content. The "Title Search Pointer Table" is as follows:

| Contents | Number of bytes |
| --- | --- |
| Number of Titles | 2 bytes |
| Reserved | 2 bytes |
| Edn address of TT_SRPT | 4 bytes |
| 12-Byte Entries | 12 bytes × number of entries |

Each 12-byte entry in the "Title Search Pointer Table" is as follows:

| Offset | Contents | Number of bytes |
| --- | --- | --- |
| 0 | Title type | 1 bytes |
| 1 | Number of angles | 1 byte |
| 2 | Number of Chapters (PTTs) | 2 bytes |
| 4 | Parental Management Mask | 2 bytes |
| 6 | Video Title Set number | 1 byte |
| 7 | Title Number within Video Title Set | 1 byte |
| 8 | Start sector for Video Title Set referenced to whole disk (video ts.ifo starts at sector 00000000) | 4 bytes |

Each Video Title Set also includes a Title Search Pointer Table (i.e. VTS PTT SRPT) and a VTS PTT table and a VTS_PGCI table that describe the Program Chains and Programs in each Part-of-Title (PTT or Chapter) within the Video Title Set. SourceForge.net indicates that a program chain is typically described by a PGC header table, a command table, a program map table, a cell playback information table, and a cell position table.

The PGC header table is as follows:

| Offset | Contents | Number of bytes |
|---|---|---|
| 0000 | | 2 bytes |
| 0002 | Number of programs | 1 byte |
| 0003 | Number of cells | 1 bytes |
| 0004 | Playback time, BCD, hh:mm:ss:ff and frame rate | 4 bytes |
| 0008 | Prohibited user operations | 4 byte |
| 000C | Audio Stream Control Table | 8 × 2 bytes |
| 001C | Subpicture Stream Control Table | 32 × 4 bytes |
| 009C | NextPGCN | 2 bytes |
| 009E | Previous PGCN | 2 bytes |
| 00A0 | Group PGCN | 2 bytes |
| 00A2 | PGC still time | 1 byte |
| 00A3 | PG playback mode | 1 byte |
| 00A4 | Palette (0, Y, Cr, Cb) | 1 byte |
| 00E4 | Offset within PGC to Command Table | 2 bytes |
| 00E6 | Offset within PGC to Program Map Table | 2 bytes |
| 00E8 | Offset within PGC to Cell Playback Information Table | 2 bytes |
| 00EA | Offset within PGC to Cell Position Information Table | 2 bytes |

The Command Table is as follows:

| Offset | Contents | Number of bytes |
|---|---|---|
| 0000 | Number of Pre commands | 2 bytes |
| 0002 | Number of Post commands | 2 byte |
| 0004 | Number of cell commands | 2 bytes |
| 0006 | End Address Relative to Command Table | 2 bytes |
| 0008 | Pre Commands | Pre × 8 bytes |
| 0008 + pre*8 | Post Commands | Post × 8 bytes |
| 0008 + (pre + post)*8 | Cell Commands | Cell × 8 bytes |

The Program Map Table includes one program map per entry per program that includes a cell number. Each cell has an entry in the Cell Playback Information Table as follows:

| Offset | Contents | Number of bytes |
|---|---|---|
| 0000 | Cell category | 4 bytes |
| 0004 | Cell playback time | 4 bytes |
| 0008 | First VOBU start sector | 4 bytes |
| 000C | First ILVU end sector | 4 bytes |
| 0010 | Last VOBU start sector | 4 bytes |
| 0014 | Last VOBU end sector | 4 bytes |

Each cell has an entry in the Cell Position Information Table as follows:

| Offset | Contents | Number of bytes |
|---|---|---|
| 0000 | VOBID | 2 bytes |
| 0002 | Reserved | 1 byte |
| 0003 | Cell ID | 1 byte |

Interactive multimedia content authored in accordance with the DVD-Video specification can include the above tables and a number of other tables that define the audio streams, subtitle streams, parental controls associated with the interactive multimedia content. Although specific tables are identified above, additional information concerning the tables within interactive multimedia content authored in accordance with the DVD-Video specification can be obtained by entering into the necessary agreements to secure a complete copy of the DVD-Video specification.

Figure 5:
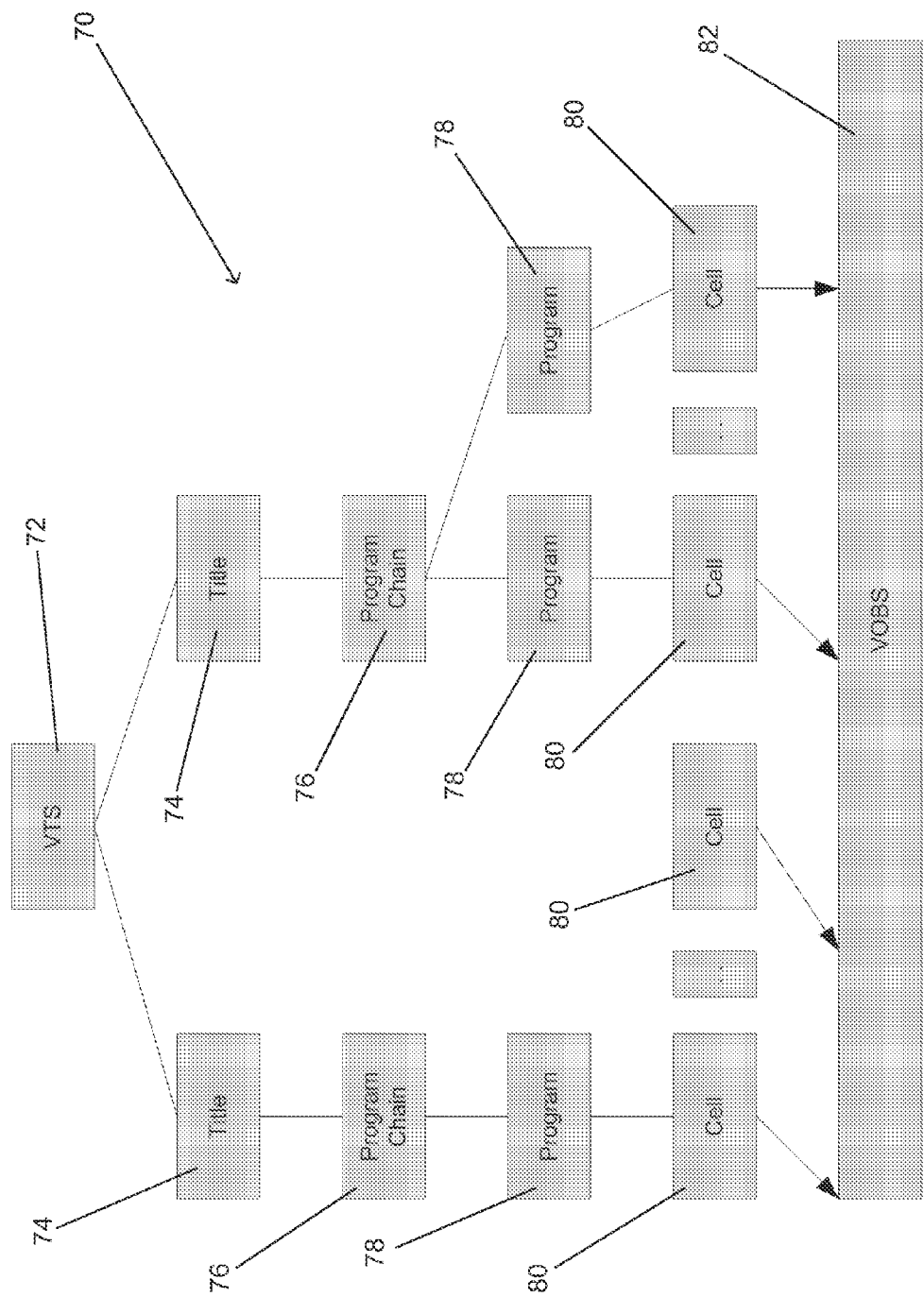
FIG. 5 is a chart conceptually illustrating an object model of a program chain generated in accordance with an embodiment of the invention.

As noted above, an object model of the interactive multimedia content can be obtained by parsing the tables within the IFO files of the Video Manager and each Video Title Set. The generation of an object model for a single Video Title Set within a piece of interactive multimedia content authored in accordance with the DVD-Video specification by parsing the IFO files of the interactive multimedia content in accordance with an embodiment of the invention is conceptually illustrated in FIG. 5. By parsing the tables within the IFO file of the Video Manager and the Video Title Set that describe titles within a video title set discussed above, objects corresponding to a plurality of titles 74 within the Video Title Set are inserted within the object model 70. By parsing the tables within the IFO file within the Video Title Set that describes the program chains within each title (see discussion above), each program chain 76, and program 78 within each title in the Video Title Set can be inserted within the object model 70. In addition, the tables within the IFO file of the Video Title Set that describe the cells associated with each program (see discussion above) can be parsed and information concerning each cell 80 and the media in the VOBs 82 within the Video Title Set can be added to the object model 70. Additional tables within the IFO files of the Video Manager and the Video Title Set can also be parsed to add additional objects to the object model of the Video Title Set in accordance with embodiments of the invention.

Although a specific process for building an object model of a Video Title Set is discussed above with respect to FIG. 5, a complete object model for all of the interactive multimedia content within a DVD-Video disc can be generated in accordance with embodiments of the invention. Much of the interactive multimedia content authored in accordance with the DVD-Video specification includes one or more interactive menus, a feature multimedia presentation, and can include "first play" multimedia content and additional features. Processes for parsing the IFO files of interactive multimedia content authored based on the DVD-Video specification in accordance with embodiments of the invention to build an object model in which each of these elements of the interactive multimedia content are represented are discussed further below.

Figure 6:
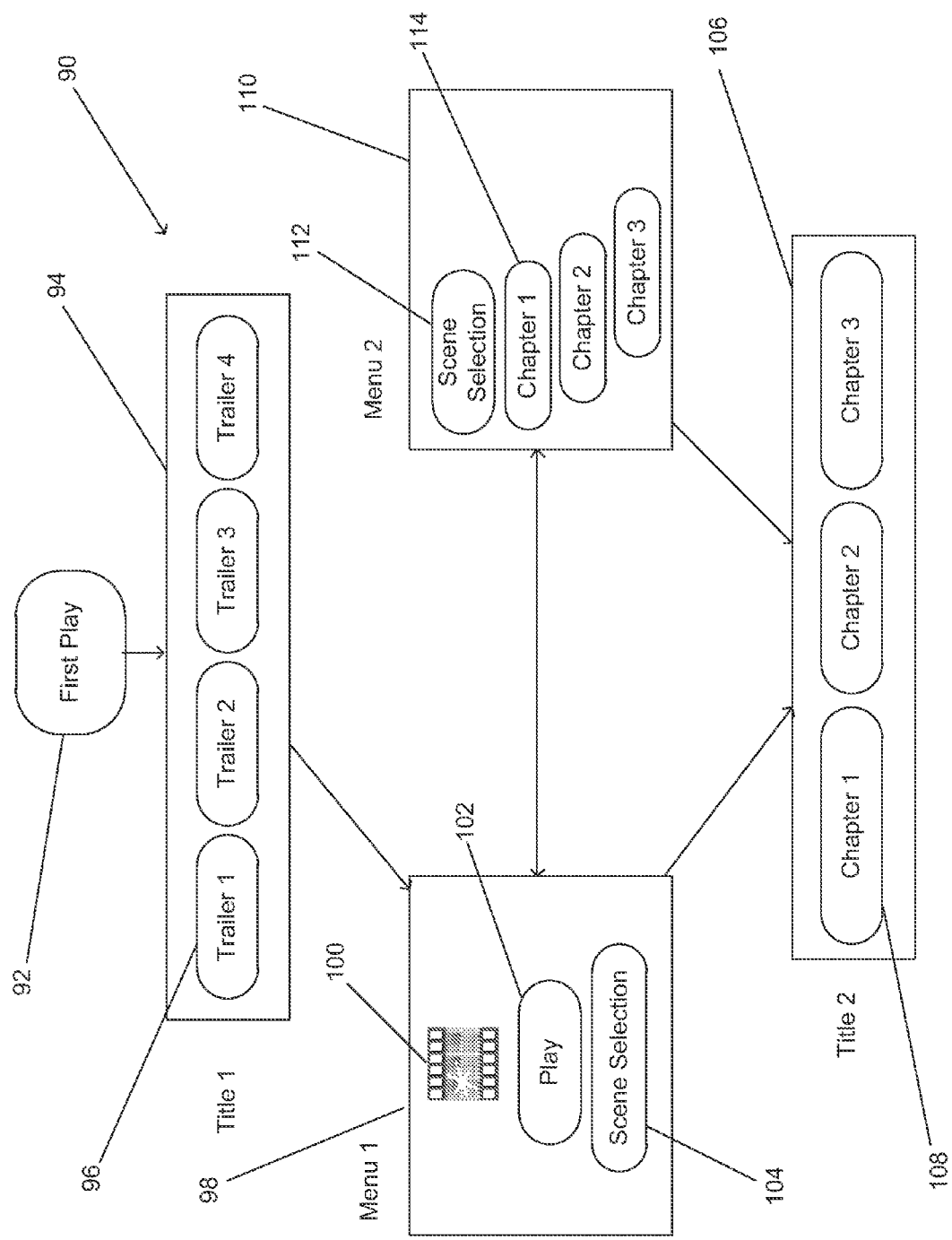
FIG. 6 is a chart conceptually illustrating an object model of a piece of interactive multimedia content authored in accordance with the DVD specification.

An object model of a piece of interactive multimedia content that includes first play multimedia content, a hierarchy of interactive menus and a feature presentation that can be generated in accordance with embodiments of the invention is conceptually illustrated in FIG. 6. When generating the object model 90 shown in FIG. 6 a parser parsed the IFO files of the Video Manager and Video Title Sets within the interactive multimedia content. In parsing the Video Manager, the parser identified the presence of first play multimedia content and inserted a first play object 92 into the object model 90. In the illustrated embodiment, the first play multimedia content is a Video Title Set 94 including a sequence of trailers 94. The Video Title Set 94 and the Program Chains associated with each trailer 96 are shown in a simplified form, but can be represented within the object model 90 using objects similar to those illustrated in FIG. 5 (see discussion above). The parser also identified the presence of a Video Title Set associated with a feature presentation that includes a hierarchy of interactive menus (i.e. a "VTS zz O.VOB" file is present in the original interactive multimedia content and is described in the IFO files of the Video Manager and the corresponding Video Title Set). A first menu object 98 is inserted in the object model to represent the first menu level in the interactive menu hierarchy. In the illustrated embodiment, the parser has inserted objects indicative of multimedia content 100 played in the background as the menu is rendered and button objects describing a "play" button 102 and a "scene selection" button 104. In addition to describing the appearance of the buttons, the object model describes actions to be performed in response to various interactions with the buttons (e.g. "on select", "on up", "on down"). In the illustrated embodiment, the object model indicates that when the "play" button 102 in the first menu object 98 is selected playback of the feature presentation represented in a Video Title Set object 106 corresponding to the feature presentation should commence. In the illustrated embodiment, the parser identified the definition of chapters within the feature presentation and inserted chapter objects 108 within the object model 90. The Video Title Set object 106 and the chapter objects 108 related to the feature presentation are shown in a simplified form, but can be represented within the object model 90 using objects similar to those illustrated in FIG. 5 (see discussion above). The object model indicates that when the "scene selection" button 104 is selected a second menu should be displayed. The second menu is represented in the object model 90 as a menu object 110 that includes an object 112 indicative of multimedia content displayed in the background of the second menu and a series of chapter button objects 114 that indicate a chapter within the feature presentation that should be played back when the button is selected.

Although specific objects associated with the specific features of a piece of interactive multimedia content authored in accordance with the DVD-Video specification are shown in FIG. 6, any feature of a piece of interactive multimedia content authored in accordance with the DVD-Video specification can be identified by parsing the IFO and VOB files within the interactive multimedia content and represented as an object within an object model. As is discussed further below, once an object model is obtained of the interactive multimedia content the various pieces of multimedia content can be extracted from the VOB files and the object model and the extracted multimedia content can be used to author HTML5 pages and container files containing the extracted multimedia content to enable the electronic distribution of the interactive multimedia content. The authoring of HTML5 pages and container files based upon an object model of interactive multimedia content in accordance with an embodiment of the invention is discussed further below.

Authoring HTML5 Pages Using an Object Model

Once an object model of a piece of interactive multimedia content has been generated, the object model can be used to generate HTML5 pages and JavaScript. In a number of embodiments, a separate HTML5 page and (often) an associated JavaScript file is generated for each program chain identified within the object model. Each HTML5 page is generated based upon the objects associated with the program chain in the object model. The JavaScript can be generated by translating the DVD-Video navigation instructions associated with the objects in the Object Model.

Figure 7:
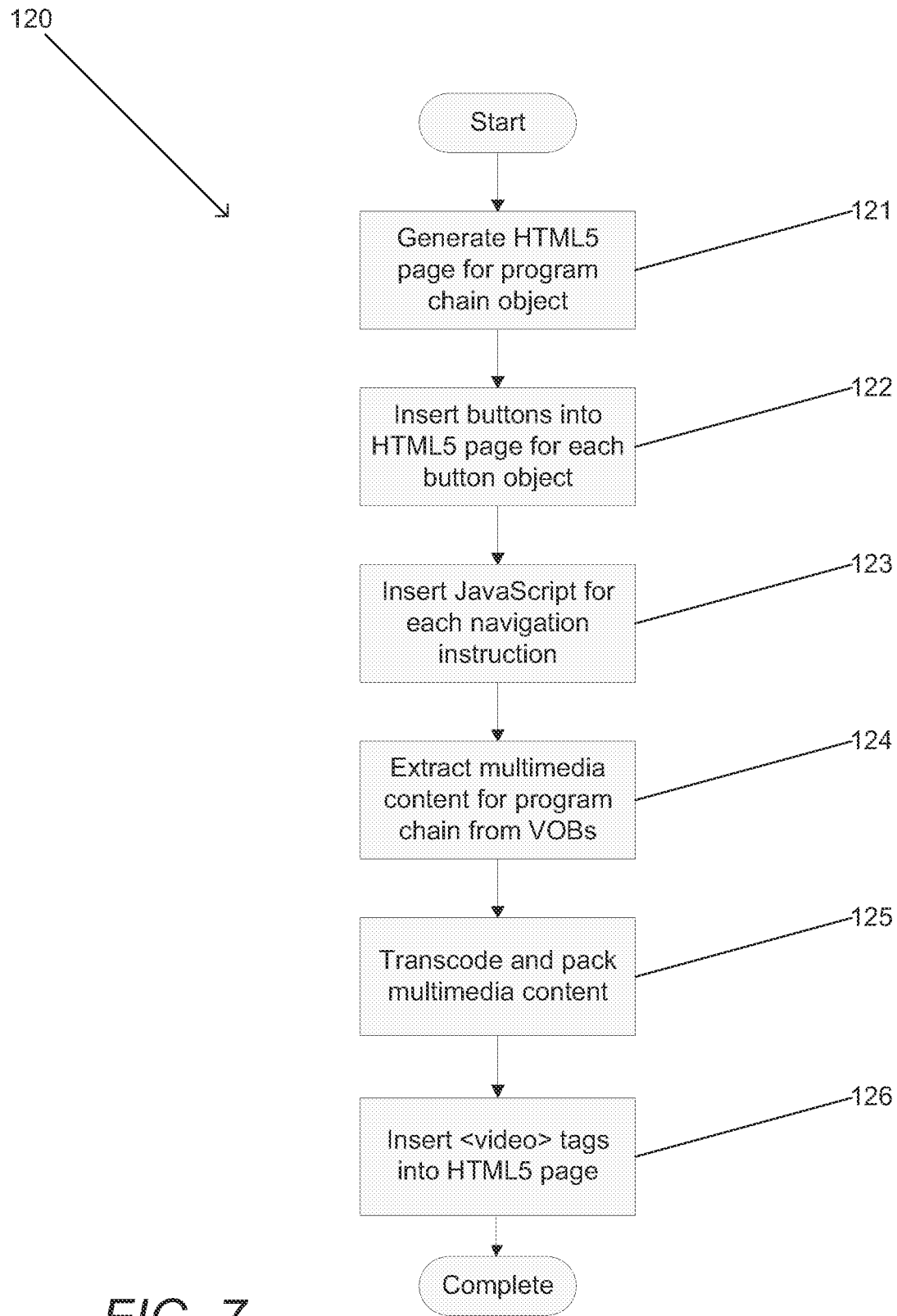
FIG. 7 is a flow chart illustrating a process for generating HTML5 pages based upon an object model in accordance with an embodiment of the invention.

A process for generating an HTML5 page based upon objects associated with a program chain in an object model in accordance with an embodiment of the invention is illustrated in FIG. 7. The process 120 includes automatically generating (121) a new HTML5 page for the program chain. When the object model of the program chain references buttons (e.g. a program chain associated with an interactive menu), then button elements are inserted (122) into the HTML5 page for that chain with appropriate dimensions and in appropriate locations. When the objects describing the program chain include navigation information, the navigation information is translated to corresponding JavaScript and the JavaScript added (123) to the HTML5 page and/or a JavaScript file. Typically, navigation information are associated with a program chain and are executed either at the start or end of the multimedia presentation associated with the program chain or the navigation information are associated with button objects and are executed in response to a user instruction when a button is activated. In many instances, processes can be utilized to programmatically add new interactivity with JavaScript that exceeds the functionality of the originally authored interactive multimedia content. In a number of embodiments, the JavaScript instructions include instructions associated with a mouse or a game controller such as hover over navigation information. In this way, the object model forms the basis of the DOM of the HTML5 page.

When a program chain includes a multimedia presentation, the relevant multimedia information is extracted (124) from the relevant VOBs (as indicated by the object model) in the original interactive multimedia content. In many embodiments, the extracted multimedia is written to a temporary container file (which can be a VOB file or a variant of a VOB file) containing the contiguous video presented by the program chain and the audio and or video in the container file is transcoded (125) into appropriate audio and/or video formats. In several embodiments, the process reverses a process utilized in the authoring of the DVD-Video content in which small pieces of video content making up a program chain were concatenated into one or more VOB files. The process reverses the concatenation by breaking the VOB files into smaller video elements that can then be transcoded. The audio and/or video can then be packed (125) into a container file and a video element tag inserted (126) into the HTML5 page associated with the program chain. Although a specific transcoding process is discussed above, any of a variety of processes for extracting multimedia content from the VOBs of the original interactive multimedia content can be utilized to generate one or more multimedia files in accordance with embodiments of the invention. In several embodiments, the transcoding and packing of the multimedia content is performed separately of the initial generation of the HTML5 pages and the multimedia content for all of the program chains is packed into a single container file. At which point, many embodiments of the invention update the video element tags in the HTML5 pages to appropriately index the multimedia content within the container file.

In many embodiments, the HTML5 files generated from the object model are for rendering by a number of different classes of device possessing different playback capabilities. Accordingly, in several embodiments, Cascading Style Sheets (CSSs) are also automatically generated to enable the rendering of the HTML5 pages in a manner appropriate to the capabilities of a specific device. In addition, the multimedia content can be transcoded into a variety of different video formats and/or using a variety of different encoding parameters so that the video can be played back on a variety of devices possessing different codecs and different display capabilities.

Figure 8:
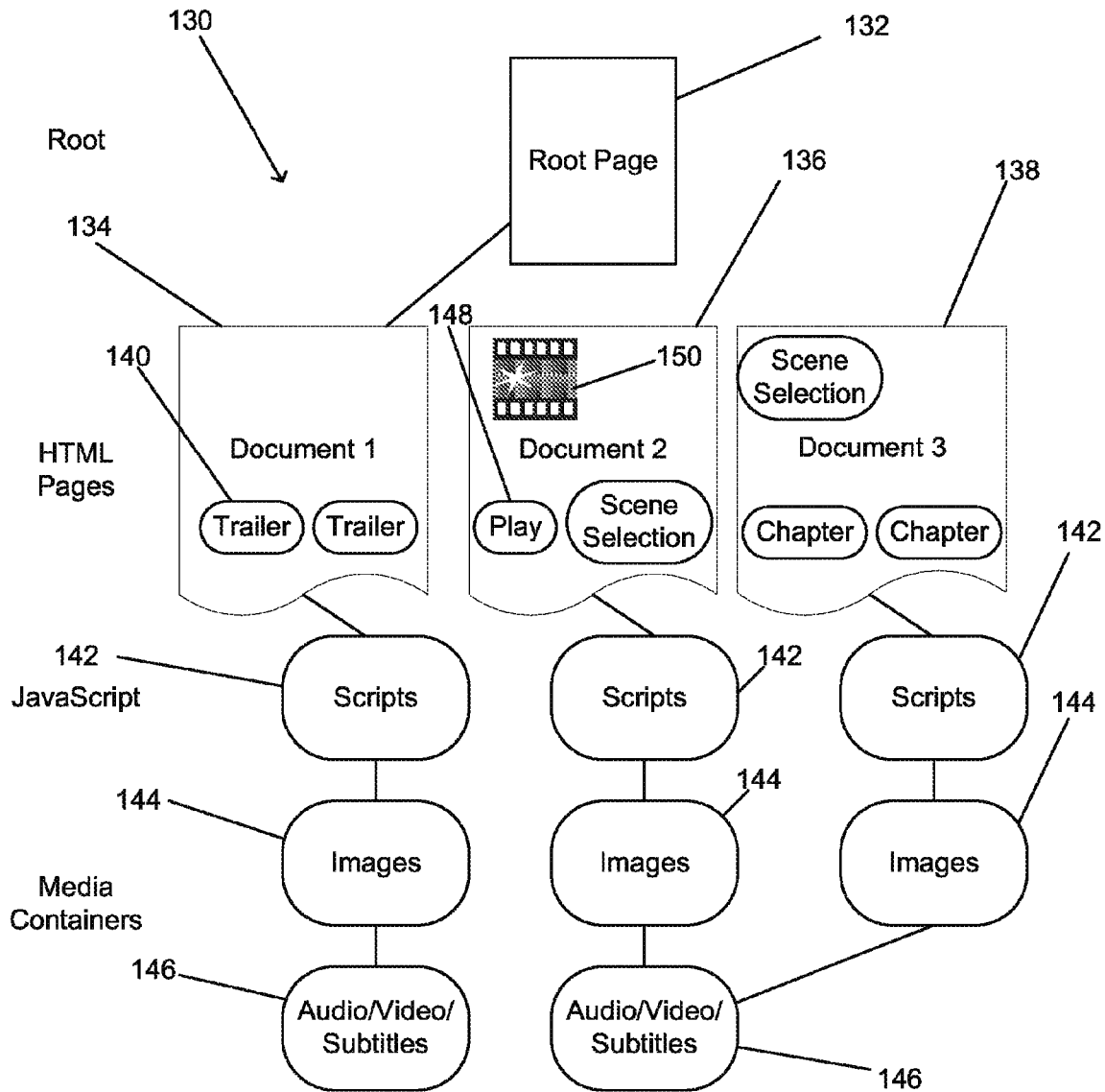
FIG. 8 is a chart conceptually illustrating a set of HTML5 pages and associated JavaScript and media container files generated from interactive multimedia content originally authored based upon the DVD-Video specification in accordance with an embodiment of the invention.

Application of the process illustrated in FIG. 7 to the object model conceptually illustrated in FIG. 6 can be used to generate HTML5 pages and associated content files similar to those conceptually illustrated in FIG. 8. The interactive multimedia content 130 is accessed via a root HTML5 page 132 generated during the authoring process. Due to the object model 90 shown in FIG. 6 including first play content, the root HTML5 page 132 only provides access to a first HTML5 page 134 for the program chain associated with the first play content. The first HTML5 page 134 includes video elements 140 associated with each of the trailers and the rendering engine of a playback device can enable playback of the multimedia content associated with the trailers using an appropriate codec within the playback device's multimedia framework. In the illustrated embodiment, the first HTML5 page includes an associated JavaScript file 142 and a number of container files that contain media information including at least one container file containing image data 144 referenced within the first HTML5 page 134, and at least one media container file 146 containing encoded audio, video, and/or subtitle information referenced within the first HTML5 page 134. Referring back to the object model 90 shown in FIG. 6, the object model indicates that there is a two level hierarchical menu that enables access to a feature presentation. Each menu is implemented as a separate HTML5 page 136, 138. A second HTML5 page 136 represents the top level of the hierarchical menu and includes button elements 148 that implement the "play" button and the "scene selection" button from the object model 90. The second HTML5 page 136 also includes a video element 150 corresponding to the background video that is rendered beneath the button elements. As with the first HTML5 page 134, the second HTML5 page 136 includes an associated JavaScript file, and media container files. A third HTML5 page 138 represents, the second level of the hierarchical menu and includes button elements that enable access at chapter points to the feature presentation. In the illustrated embodiment, the third HTML5 page 138 has associated JavaScript 142 and media container files 144 containing images. The video elements within the third HTML5 page (as can be the case with any of the HTML5 pages) reference the same media container file 146 containing audio/video/subtitle information as the media container file referenced by the second HTML5 page 136.

As can readily be appreciated any number of HTML5 pages including any of a variety of button and video elements can be generated in accordance with embodiments of the invention using an object model generated by parsing content authored based upon the DVDVideo specification as the basis of the DOM of the HTML5 page. In addition, the HTML5 pages and the associated media content referenced by the HTML5 pages can be combined into a single file to facilitate the electronic distribution of the interactive multimedia content. Furthermore, although much of the above discussion references HTML5 and its associated elements, object models can be utilized to generate interactive multimedia content using any of a variety of markup languages including (but not limited to) HTML5.

Interactive Multimedia Content Authored for Distribution Via BD-ROM

The BD-ROM specification was created by the Blu-ray Disc Association. BD-ROM is intended to supersede the DVD-Video format. According to Wikipedia.org, the BD-ROM specification specifies the use of Universal Disk Format (UDF) 2.50. A document entitled "White paper Blu-ray Disc™ Read-Only Format—2.B Audio Visual Application Format Specifications for BD-ROM Version 2.4" available from http://www.bluraydisc.com/Assets/Downloadablefile/BDROM_Audio_Visual_Application_Format_Specifications-18780.prf (the disclosure of which is incorporated by reference herein in its entirety) explains that a BD-ROM can be authored in High Definition Movie (HDMV) mode or BD-J mode. The HDMV mode is intended as an easyto-author framework supporting all of the features supported by the DVD-Video specification. Indeed, HDMV mode is intended for use during the content production and material preparation process of authoring DVD-Video interactive multimedia content to enable simultaneous production of DVD-Video and BD-ROM content. The BD-J mode is based on the Java™ platform and provides a fully programmable application environment with network connectivity. Java is a platform independent programming environment that is deployed in a wide variety of environments.

Figure 9:
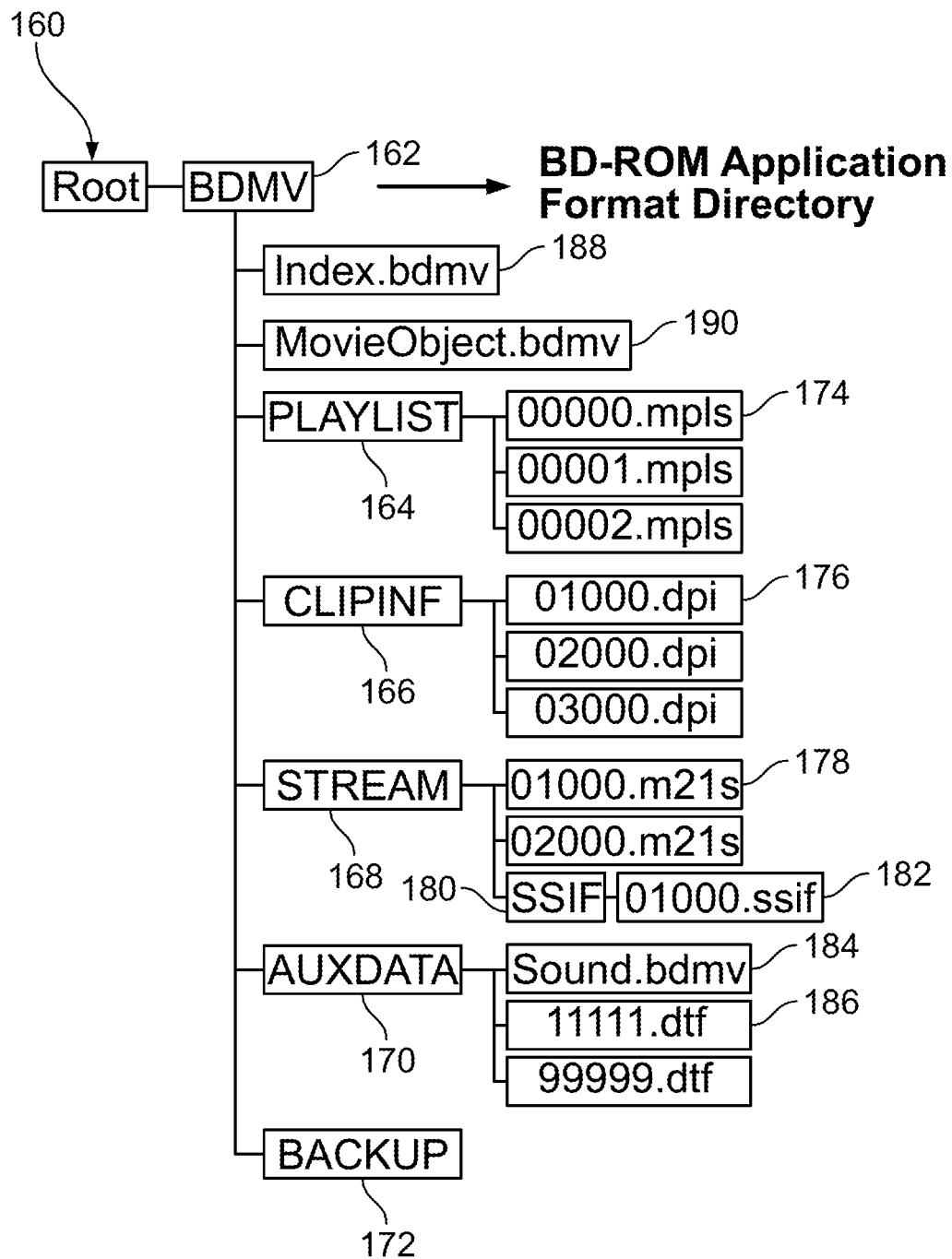
FIG. 9 is a chart reproduced from "White paper Blu-ray Disc™ Read-Only Format—2.B Audio Visual Application Format Specifications for BD-ROM Version 2.4" showing the file system of interactive multimedia content authored in accordance with the BD-ROM specification.

The whitepaper referenced above provides details concerning the BD-ROM file format including an illustration of the BD-ROM file format reproduced as FIG. 9. The file system 160 includes a BDMV directory 162 that contains the PLAYLIST 164, CLIPINF 166, STREAM 168, AUXDATA 170, and BACKUP 172 directories. The PLAYLIST directory 164 contains the database files 174 for movie playlists. Each playlist has its own xxxxx.mpls file. The CLIPINF directory 166 contains the database files 176 for clips. The STREAM directory 168 contains audio and video stream files 178 (e.g. BDA V MPEG-2 transport streams) and the SSIF directory 180, which contains stereoscopic interleaved files 182. The AUXDATA directory 170 contains sound data files 184 and font files 186. The BACKUP directory 172 contains copies of the "index.bdmv file", the "MovieObject-.bdmv" file, all the files in the PLAYLIST directory 164 and all files in the CLIPINF directory 166. The BDMV directory 162 also contains the index.bdmv file 188 and the MovideObject.bdmv file 190. The index.bdmv stores information describing the contents of the BDMV directory. The MovieObject.bdmv file stores information for one or more Movie Objects.

Figure 10:
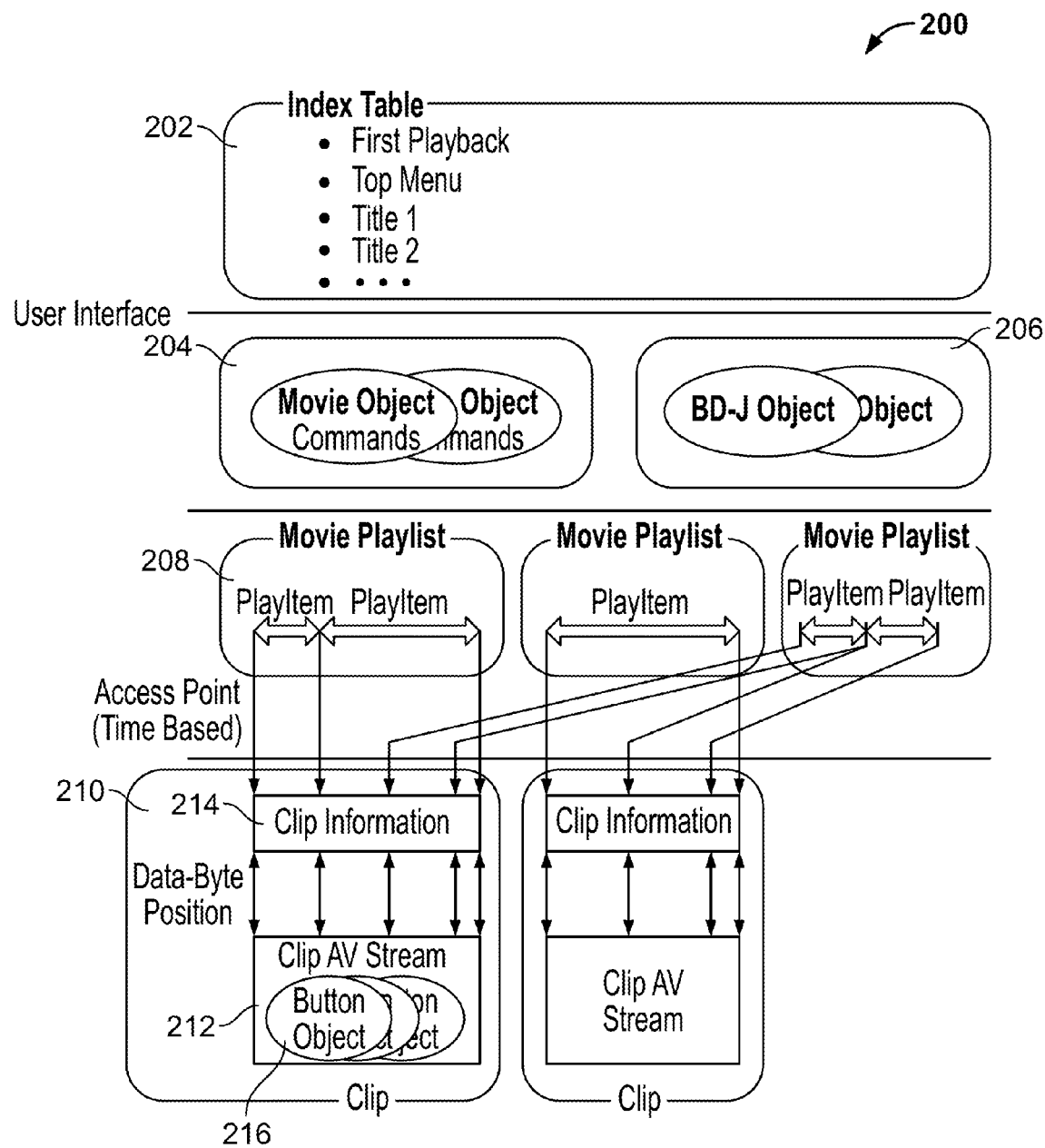
FIG. 10 is a chart reproduced from "White paper Blu-ray Disc™ Read-Only Format—2.B Audio Visual Application Format Specifications for BD-ROM Version 2.4" showing a simplified overview of the BD-ROM data structure.
Figure 11:
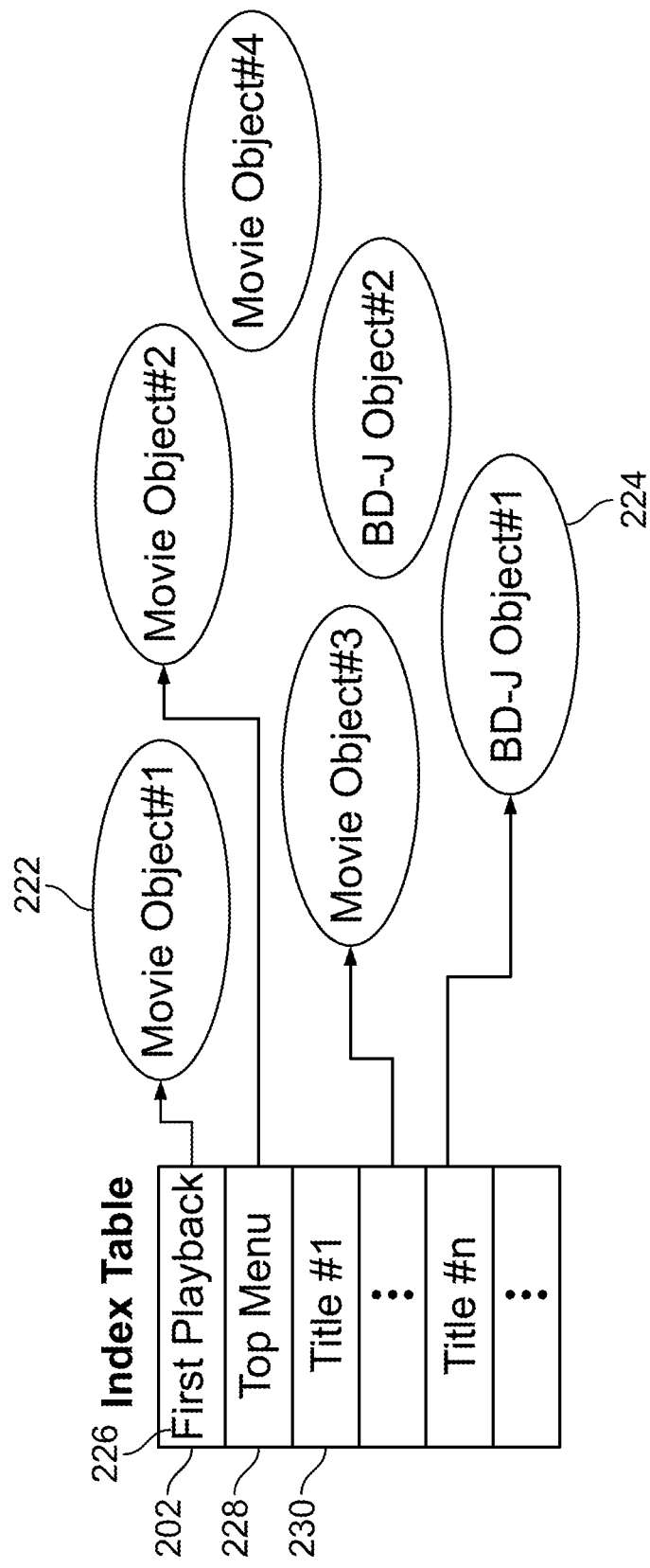
FIG. 11 is a chart reproduced from "White paper Blu-ray Disc™ Read-Only Format—2.B Audio Visual Application Format Specifications for BD-ROM Version 2.4" conceptually illustrating the Index Table of a BD-ROM.

The white paper also provides a simplified overview of the BD-ROM data structure, which is reproduced as FIG. 10. The BD-ROM data structure 200 includes an Index Table 202 at the top-level of the data structure, which defines the Titles and the Top Menu of a BD-ROM disc. An Index Table is conceptually illustrated in FIG. 11. The Index Table 202 contains entry points for all of the Titles and the Top Menu and has an entry to a Movie Object 222 and/or a BD-J Object 224 designated for "First Playback" 226. When the disc is loaded, the player refers to the "First Playback" entry to determine the corresponding Movie Object or BD-J Object that shall be executed. The Index Table 202 also contains an entry 228 for "Top Menu" and an entry 230 for each title.

Referring back to FIG. 10, the layer below the Index Table includes the Movie Objects 204 and the BD-J objects 206. Each Movie Object is an executable navigation command program. The navigation commands can launch PlayList playback or another Movie Object enabling the authoring of a set of Movie Objects for managing playback of Playlists in accordance with a user's interaction and preferences. BD-J objects 206 perform similar functions, but are implemented as Java Xlet.

Figure 12:
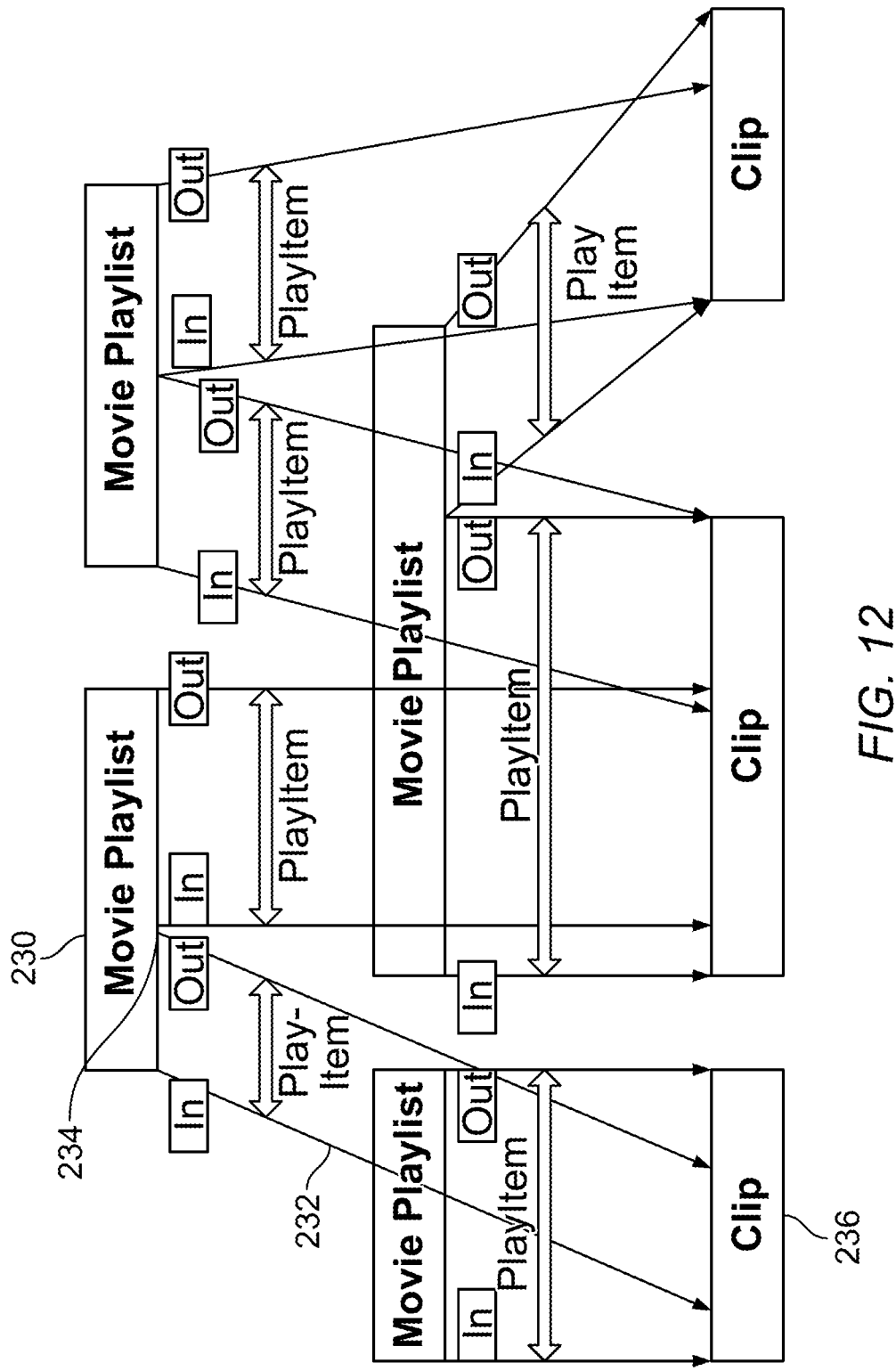
FIG. 12 is a chart reproduced from "White paper Blu-ray Disc™ Read-Only Format—2.B Audio Visual Application Format Specifications for BD-ROM Version 2.4" conceptually illustrating the manner in which MoviePlaylists index into clips on a BD-ROM.

The Movie Playlist layer 208 includes a plurality of Movie Playlists. A Movie Playlist is a collection of playing intervals in the Clips. One such interval is referred to as a PlayItem and includes an IN-point and an OUT-point, each of which refers to positions on a time axis of the Clip. The manner in which MoviePlaylists index into the clips is illustrated in FIG. 12. Each Movie Playlist 230 includes IN-points 232 and OUT-points 234 that index to positions in a Clip 236.

Referring back to FIG. 10, the bottom layer of the BD-ROM data structure is the Clip layer 210. An AV stream file together with its associated database attributes is considered to be one object. The AV stream file is called a Clip AV stream file 212, and the associated database attribute file is called a Clip Information File 214. The Clip AV stream file 212 stores an MPEG-2 Transport Stream in accordance with ISO/IEC 13818-1 in a structure compliant with the BD-ROM AV specification. The Clip Information file stores the time stamps of the access point into the corresponding AV stream file. A player can read the Clip Information file to find out the position where it should begin to read the data from the AV stream file.

The Clip AV stream file can include an Interactive Graphics stream that is utilized in HDMV to generate a "Pop-Up" Menu Interface. In this case, video playback can continue while the HDMV Interactive Graphics are on the screen or video playback may be paused. Using the HDMV Interactive Graphics framework, multi-page menus can be defined with special commands available for inter-page navigation. As part of the framework, Button Objects 216 can be defined. When a Button is activated, a corresponding navigation command is executed which causes the display to change to a specified page. The HDMV Interactive Graphics framework also provides a scheme for dynamic graphics display. On a single page, this enables the Content Provider to determine dynamically which Buttons are visible and invisible at any point in time.

For HDMV BD-ROM content, Movie Objects and the Button Objects contain navigation commands. A Movie Object is executed when the Title associated with the Movie Object begins playback. Movie Object navigation commands are used to manage PlayList playback. While a PlayList is under playback, the state of a Movie Object is maintained. A Button Object is an alternative programming method that is available while the PlayList is under playback and a Button Object is executed by user activation or system timer.

Building an Object Model of a HDMV BD-ROM

Using processes similar to those described above with respect to interactive multimedia content authored in accordance with the DVD-Video specification, content authored in accordance with the BD-ROM specification utilizing the HDMV framework can be parsed to create an object model. The Index Table can be parsed to identify each of the Movie Objects. The Movie Objects can then be used to insert objects corresponding to the Movie Playlists, Clips, and Button Objects into the object model utilizing the navigation information associated with the Movie Objects and the Button Objects. Once the object model has been constructed, the object model can be utilized to generate an HTML5 page for each Movie Object and an associated JavaScript file that captures the navigation information contained within Movie Objects and the Button Objects. In addition, audio/video/subtitle information in the clips associated with each Movie Object can be extracted, transcoded (optional) and inserted into one or more container files in a manner similar to that outlined above with respect to the extraction of audio/video/subtitle information from VOB files.

Building an Object Model of a BD-J BD-ROM

The process for building an object model of title with a BD-J object associated with it is similar to the process outlined above with the exception that the content authoring system parses the BD-J object to identify standard objects and translates navigation instructions within the BD-J Java Xlet. In many embodiments, the content authoring system has access to the original source code for the Java Xlet and can construct an object model from the source code. When the original source code is not available, the content authoring system can parse the bytecode of the Java Xlet. In a number of embodiments, standard object libraries are used in the authoring of BD-J Java Xlets and the content authoring system is configured to identify the standard objects in building the object model. Once the object model has been constructed, the object model can be utilized to generate an HTML5 page or a set of HTML5 pages for each BDJ object and an associated JavaScript file that captures the navigation information contained within the BD-J Java Xlet. In addition, audio/video/subtitle information in the clips associated with each BD-J can be extracted, transcoded (optional) and inserted into one or more container files in a manner similar to that outlined above with respect to the extraction of audio/video/subtitle information from VOB files.

Using processes similar to those described above with respect to interactive multimedia content authored in accordance with the DVD-Video specification, content authored in accordance with the BD-ROM specification utilizing the HDMV framework can be parsed to create an object model. The Index Table can be parsed to identify each of the Movie Objects. The Movie Objects can then be used to insert objects corresponding to the Movie Playlists, Clips, and Button Objects into the object model utilizing the navigation information associated with the Movie Objects and the Button Objects. Once the object model has been constructed, the object model can be utilized to generate an HTML5 page for each Movie Object and an associated JavaScript file that captures the navigation information contained within Movie Objects and the Button Objects. In addition, audio/video/subtitle information in the clips associated with each Movie Object can be transcoded and inserted into one or more container files in a manner similar to that outlined above with respect to the extraction of audio/video/subtitle information from VOB files.

Insertion of Additional Features into EST Content

When interactive multimedia content authored for distribution via physical media is converted for electronic distribution in accordance with an embodiment of the invention, the conversion process is not limited to simply replicating the original interactive content, or preserving its original look and feel. For example, the playback client can enable text searching within the content using the subtitles to locate specific dialogue. A unique identifier or token can be generated for the interactive multimedia content and used to associate metadata with the interactive multimedia content and by third party applications to locate and retrieve the interactive multimedia content. The conversion process itself can contain additional processes that can generate and insert new, up to date content into the newly rendered package. In addition, metadata associated with the interactive multimedia content can be inserted into the converted content and/or links to metadata can be inserted into the multimedia content. In addition, digital rights management techniques can be used to technically protect the content for EST.

Discovery of EST Content

Generating a unique token identifying the multimedia content at the time it is converted from its original format can facilitate the identification of converted interactive multimedia content. The unique token can then be utilized to register the location of the interactive multimedia content and to enable modification of the metadata related to the content. Once registered, the unique token can be utilized by content guides and third party applications to identify the content for EST and to facilitate the retrieval of the content via a network. In many embodiments, individual content owners can generate interactive multimedia content for electronic distribution in accordance with embodiments of the invention and any resulting unique identifiers and/or tokens can be registered in a database containing a directory of locations in which the interactive multimedia content can be downloaded and metadata or links to metadata associated with the interactive multimedia content.

While the above description contains many specific embodiments of the invention, these should not be construed as limitations on the scope of the invention, but rather as an example of one embodiment thereof. For example, embodiments of the invention are not limited to parsing interactive multimedia content authored in accordance with the DVD-Video specification or the generation of HTML5 pages from object models created using the original interactive content. Accordingly, the scope of the invention should be determined not by the embodiments illustrated, but by the appended claims and their equivalents.

What is claimed:

1. A system for providing interactive multimedia content distributed via a physical medium in an electronic distribution format, the system comprising:
control circuitry configured to:
receive interactive multimedia content from a physical medium, wherein the interactive multimedia content comprises multimedia content and an interactive feature related to the multimedia content;
automatically, without user input, construct an object corresponding to the interactive feature;
automatically, without user input, create an object model of the interactive multimedia content, wherein the object model comprises the object corresponding to the interactive feature and a portion of the multimedia content associated with the interactive feature;
receive instructions, from a user equipment, to provide the interactive multimedia content in an electronic distribution format, wherein the interactive multimedia content in the electronic distribution format is based on the object model;
determine whether the interactive multimedia content is authorized for electronic distribution to the user equipment; and
in response to determining that the interactive multimedia content is authorized for electronic distribution to the user equipment, transmit, to the user equipment, the interactive multimedia content in the electronic distribution format.

2. The system of claim 1, wherein the interactive feature is a first interactive feature and the object is a first object, and wherein the control circuitry is further configured to:
construct a second object corresponding to a second interactive feature related to the multimedia content; and
connect the first and second objects for inclusion in the object model.

3. The system of claim 2, wherein the portion of the multimedia content is a first portion of the multimedia content, the second interactive feature is associated with a second portion of the multimedia content, and wherein the control circuitry is configured to connect the first and second objects based on a relationship between the first and second portions of the multimedia content.

4. The system of claim 1, wherein the control circuitry is further configured to pack the multimedia content into at least one container file.

5. The system of claim 4, wherein the control circuitry is further configured to generate a unique identifier for the at least one container file.

6. The system of claim 4, the control circuitry further configured to electronically distribute at least a portion of the at least one container file via a network connection.

7. The system of claim 1, the control circuitry further configured to transcode at least a portion of the multimedia content.

8. The system of claim 7, wherein the control circuitry configured to transcode at least a portion of the multimedia content is further configured to transcode at least a portion of video content to reduce the size of the video content.

9. The system of claim 7, wherein the control circuitry configured to transcode at least a portion of the multimedia content is further configured to multiplex at least one video stream and at least one audio stream into at least one container file.

10. The system of claim 7, wherein the control circuitry is further configured to transcode at least a portion of video content into a plurality of streams having different bitrates.

11. A method for providing interactive multimedia content distributed via a physical medium in an electronic distribution format, the method comprising steps for:
receiving interactive multimedia content from a physical medium, wherein the interactive multimedia content comprises multimedia content and an interactive feature related to the multimedia content;
automatically, without user input, constructing an object corresponding to the interactive feature;
automatically, without user input, creating an object model of the interactive multimedia content, wherein the object model comprises the object corresponding to the interactive feature and a portion of the multimedia content associated with the interactive feature;
receiving instructions, from a user equipment, to provide the interactive multimedia content in an electronic distribution format, wherein the interactive multimedia content in the electronic distribution format is based on the object model;
determining whether the interactive multimedia content is authorized for electronic distribution to the user equipment; and
in response to determining that the interactive multimedia content is authorized for electronic distribution to the user equipment, transmit, to the user equipment, the interactive multimedia content in the electronic distribution format.

12. The method of claim 11, wherein the interactive feature is a first interactive feature and the object is a first object, and wherein the method further comprises:
constructing a second object corresponding to a second interactive feature; and
connecting the first and second objects for inclusion in the object model.

13. The method of claim 12, wherein the portion of the multimedia content is a first portion of the multimedia content, the second interactive feature is associated with a second portion of the multimedia content, and wherein the method further comprises connecting the first and second objects based on a relationship between the first and second portions of the multimedia content.

14. The method of claim 11, further comprising packing the multimedia content into at least one container file.

15. The method of claim 14, further comprising generating a unique identifier for the at least one container file.

16. The method of claim 14, further comprising electronically distributing at least a portion of the at least one container file via a network connection.

17. The method of claim 11, further comprising transcoding at least a portion of the multimedia content.

18. The method of claim 17, wherein transcoding at least a portion of the multimedia content comprises transcoding at least a portion of video content to reduce the size of the video content.

19. The method of claim 17, further comprising transcoding at least a portion of the multimedia content comprises multiplexing at least one video stream and at least one audio stream into at least one container file.

20. The method of claim 17, further comprising transcoding at least a portion of video content into a plurality of streams having different bitrates.

\* \* \* \* \*